(12) United States Patent
Fukuda et al.

(10) Patent No.: US 10,706,513 B2
(45) Date of Patent: Jul. 7, 2020

(54) IMAGE PROCESSING APPARATUS

(71) Applicant: MAXELL, LTD., Otokuni-gun, Kyoto (JP)

(72) Inventors: Nobuhiro Fukuda, Tokyo (JP); Mitsuo Nakajima, Tokyo (JP); Kazuhiko Tanaka, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/760,325

(22) PCT Filed: Sep. 16, 2015

(86) PCT No.: PCT/JP2015/076362
§ 371 (c)(1),
(2) Date: Mar. 15, 2018

(87) PCT Pub. No.: WO2017/046905
PCT Pub. Date: Mar. 23, 2017

(65) Prior Publication Data
US 2019/0050971 A1    Feb. 14, 2019

(51) Int. Cl.
*G06T 5/00* (2006.01)
*H04N 1/60* (2006.01)
(Continued)

(52) U.S. Cl.
CPC ............ *G06T 5/009* (2013.01); *H04N 1/407* (2013.01); *H04N 1/46* (2013.01); *H04N 1/60* (2013.01);
(Continued)

(58) Field of Classification Search
CPC ............ G06K 9/4661; G06K 2209/29; G06K 9/00221; G06K 9/40; G06T 2207/10024;
(Continued)

(56) References Cited

U.S. PATENT DOCUMENTS 7,876,974 B2 * 1/2011 Brajovic ............... G06T 5/50
348/597
8,483,480 B2 * 7/2013 Smith .................. G06K 9/4652
382/173
(Continued)

FOREIGN PATENT DOCUMENTS

JP   2005-004506 A   1/2005
JP   2005-515515 A   5/2005
(Continued)

OTHER PUBLICATIONS

International Search Report of PCT/JP2015/076362 dated Oct. 27, 2015.
(Continued)

*Primary Examiner* — Aklilu K Woldemariam
(74) *Attorney, Agent, or Firm* — Mattingly & Malur, PC

(57) ABSTRACT

An image signal is subjected to image correction performed by an image correction unit on the basis of retinex processing. The image correction unit performs spectral decomposition for the image signal. A retinex unit performs retinex processing for the image signal subjected to the spectral decomposition, and a spectrum synthesis unit synthesizes the image signal output from the retinex unit. A transformation unit performs transformation from a RGB color space to a HSV color space, and an inverse transformation unit performs transformation from the HSV color space to the RGB color space. The transformation unit transforms an input image signal and outputs the transformed image signal to the spectral decomposition unit. The inverse transformation unit receives the output signal from the spectrum synthesis unit and outputs an image correction signal. Spectral decomposition of the image signal in the spectral decomposition unit is hue-based spectral decomposition in the HSV color space.

8 Claims, 19 Drawing Sheets

(51) Int. Cl.
*H04N 1/46* (2006.01)
*H04N 1/407* (2006.01)
(52) U.S. Cl.
CPC ............ *G06T 2207/10024* (2013.01); *G06T 2207/20208* (2013.01); *H04N 1/6027* (2013.01)
(58) Field of Classification Search
CPC . G06T 2207/20016; G06T 2207/20192; G06T 5/002; G06T 2207/20028; G06T 7/90; G06T 5/008; G06T 5/009; G06T 5/50; G06T 7/187; G06T 7/41; G06T 2207/20064; G06T 7/13; H04N 5/14; H04N 9/3182; H04N 1/6027; H04N 1/46; H04N 1/60; H04N 9/3194; H04N 9/735; H04N 5/357; H04N 1/4092; H04N 1/58; H04N 1/6033; H04N 1/6058; H04N 5/208; H04W 36/0066; H04W 36/0061
USPC ........ 382/167, 274, 299, 264, 173; 348/571, 348/675, 690, 234, 254, 252; 358/519, 358/520
See application file for complete search history.

(56) References Cited

U.S. PATENT DOCUMENTS

| | | | |
|---|---|---|---|
| 9,691,141 B2 * | 6/2017 | Shin | G06T 3/4015 |
| 2003/0012448 A1 | 1/2003 | Kimmel et al. | |
| 2003/0138161 A1 * | 7/2003 | Rising, III | G06T 5/10 |
| | | | 382/265 |
| 2005/0185099 A1 | 8/2005 | Ohsawa et al. | |
| 2008/0107333 A1 * | 5/2008 | Mazinani | G06T 5/20 |
| | | | 382/167 |
| 2010/0008574 A1 * | 1/2010 | Ishiga | H04N 5/357 |
| | | | 382/167 |
| 2010/0066874 A1 * | 3/2010 | Ishiga | G06T 5/002 |
| | | | 348/252 |
| 2014/0092307 A1 * | 4/2014 | Fukuda | G06T 5/002 |
| | | | 348/571 |
| 2019/0050971 A1 * | 2/2019 | Fukuda | H04N 1/407 |

FOREIGN PATENT DOCUMENTS

| | | |
|---|---|---|
| JP | 2006-186898 | 7/2006 |
| JP | 2008-118392 A | 5/2008 |
| JP | 2010-147613 A | 7/2010 |
| JP | 2013-211662 A | 10/2013 |
| JP | 2014-072595 A | 4/2014 |

OTHER PUBLICATIONS

Japanese Office Action received in corresponding Japanese Application No. 2017-540403 dated Aug. 21, 2018.
Ru, Y. et al., "A Study on Multiscale Retinex with Lightness Adjustment", Jun. 1, 2015, pp. 19-24, vol. 115, No. 75.

\* cited by examiner

F I G . 17
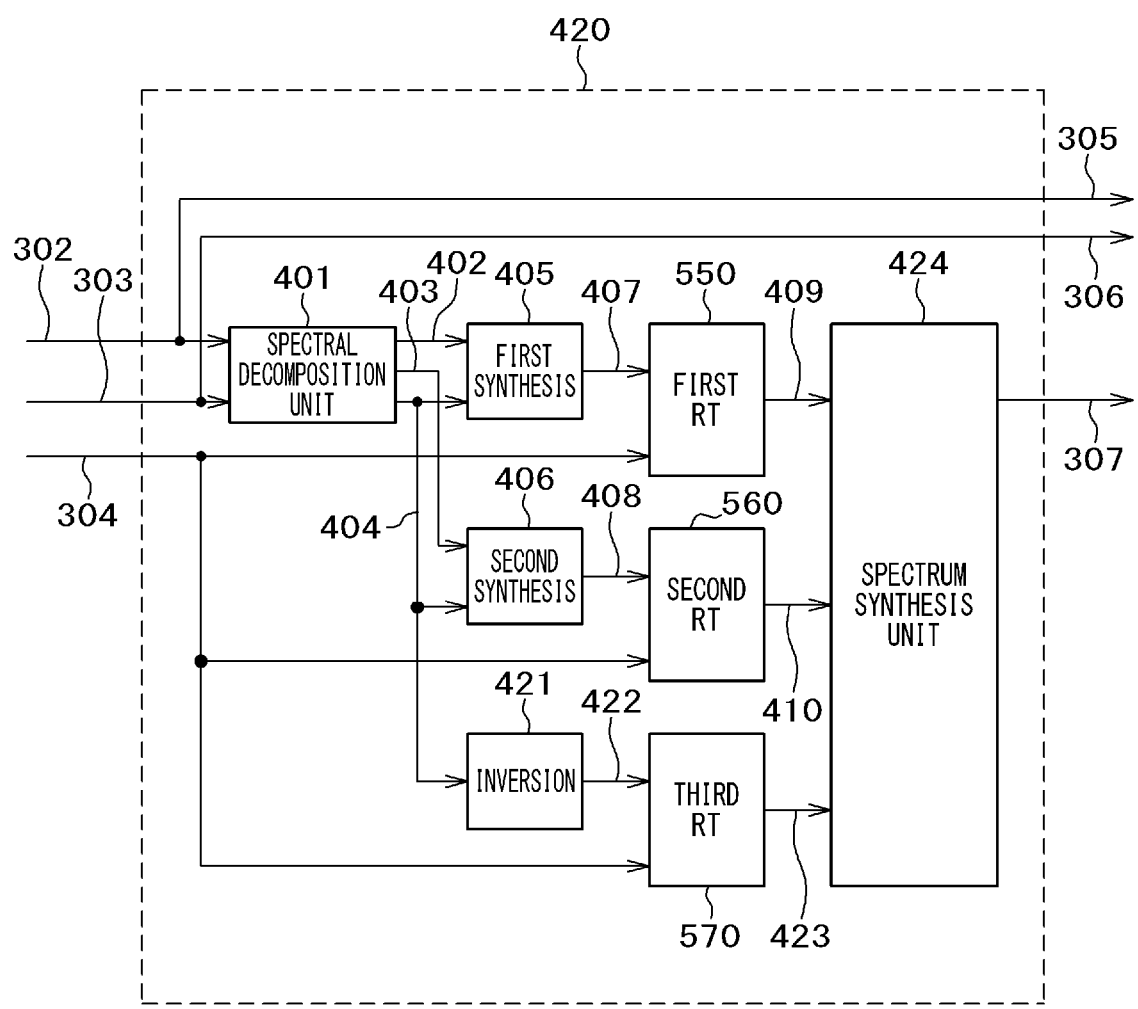

IMAGE PROCESSING APPARATUS

TECHNICAL FIELD

The present invention relates to an image processing apparatus, and more particularly, to an image processing apparatus such as a projector capable of improving a color rendering property by performing image correction based on an applied retinex theory.

BACKGROUND ART

In a contrast correction technique of the related art, when correction is performed to improve visibility of a part of luminance regions for an image having a wide luminance range from a low luminance region to a high luminance region, a gradation collapse occurs in any one of the luminance regions excluded from a target in some cases. For example, when taking a picture containing dark indoor and bright outdoor images at the same time from the bright outdoor place, and trying to raise visibility of the subject reflected in the indoor place by contrast correction, the luminance region of the outdoor image is collapsed.

In this regard, in order to address such a problem, there is known a technique of locally correcting contrast of the image. For example, a retinex theory is known in the art. The retinex theory is a theory for explaining human visual characteristics called color constancy or lightness constancy. In accordance with this theory, a reflection light component can be extracted by separating an illumination light component from the image. Therefore, in the image correction processing based on the retinex theory, it is possible to obtain a high visibility image by removing influence of the illumination light component which makes it difficult to view a subject in an image containing a dark indoor place or under bright backlight and extracting the reflection light component. For this reason, it is possible to desirably compress a natural dynamic range perceptible by human beings even in a digital grayscale.

As an example of the image processing techniques based on the retinex theory, for example, Patent Document 1 discusses multi-scale retinex processing. In Patent Document 1, any one of blurred images having different blurring degrees generated from a plurality of ambient functions having different scales is selected depending on a pixel value level of a processing target original image. As a result, synthesis blurring is created, and lowpass filtering is applied to the created image, so that retinex processing capable of preventing occurrence of unnatural boundary discontinuity is performed. Note that the multi-scale retinex processing will be described below in more details.

As an image correction technique based on the retinex theory and the Phong reflection model, Patent Document 2 is known in the art. The image processing apparatus discussed in Patent Document 2 performs high-quality image correction processing by extracting a specular reflection component and a diffuse reflection component from an input image signal and generating a correction image signal on the basis of a computation result for the extracted specular reflection component and the extracted diffuse reflection component. Note that the Phong reflection model will be described below in more details.

CITATION LIST

Patent Document

Patent Document 1: JP 2005-004506 A
Patent Document 2: JP 2014-072595 A

SUMMARY OF THE INVENTION

Problems to be Solved by the Invention

The image correction methods based on the retinex processing discussed in Patent Document 1 and Patent Document 2 are to perform signal processing for grayscale luminance or RGB luminance. That is, since the human retinae (L, M, and S retinal cones) have spectral sensitivities corresponding to three colors of red (R), green (G), and blue (B), many light sources of image display devices employs the RGB color space. Accordingly, spectrum calibration treated in the retinex processing, that is, luminance calibration through signal processing is also typically performed on the basis of the RGB color model.

However, in the actual nature, for example, a yellow object emits a yellow spectrum in many cases. However, when it is picked up by a digital camera, the yellow spectrum is divided into two spectra including red and green, and an image is also displayed in two spectra. The RGB color model is a so-called additive mixing color model that exhibits a wide range of colors by mixing three elementary colors, that is, R, G, and B. Therefore, when a color in the image is expressed using the RGB color model, it is difficult to adjust color development of various colors while maintaining correction balance between three spectra.

In view of the aforementioned problems, an object of the invention is to provide an image processing apparatus having a high color rendering property by performing image correction processing using a color model different from the RGB color model by applying the retinex theory.

Solutions to Problems

According to an aspect of the invention, there is provided an image processing apparatus that receives an image signal and outputs a signal subjected to image correction performed by an image correction unit on the basis of retinex processing, the image correction unit having a spectral decomposition unit that performs spectral decomposition for the image signal, a retinex unit that performs retinex processing for the image signal subjected to the spectral decomposition, and a spectrum synthesis unit that synthesizes the image signal output from the retinex unit and corrected through the retinex processing.

More specifically, the image correction unit further has a transformation unit that performs transformation from a RGB color space to a HSV color space or a HSL color space, and an inverse transformation unit that performs transformation from the HSV color space or HSL color space to the RGB color space. The transformation unit transforms an input image signal and outputs the transformed image signal to the spectral decomposition unit, the inverse transformation unit receives the output signal from the spectrum synthesis unit and outputs an image correction signal, and spectral decomposition of the image signal in the spectral decomposition unit is hue-based spectral decomposition in the HSV color space or the HSL color space.

Effects of the Invention

According to the invention, it is possible to provide an image processing apparatus having a high color rendering property by performing image correction processing using a color model different from the RGB color model by applying the retinex theory.

BRIEF DESCRIPTION OF THE DRAWINGS

FIG. 17 is a block diagram illustrating a high rendering color processing unit 400 according to a second embodiment of the invention.

MODE FOR CARRYING OUT THE INVENTION

Each embodiment of the invention will now be described with reference FIGS. 1 to 21C.

[Configurations of Image Processing Apparatus and Image Display Apparatus (Liquid Crystal Projector)]

Figure 1:
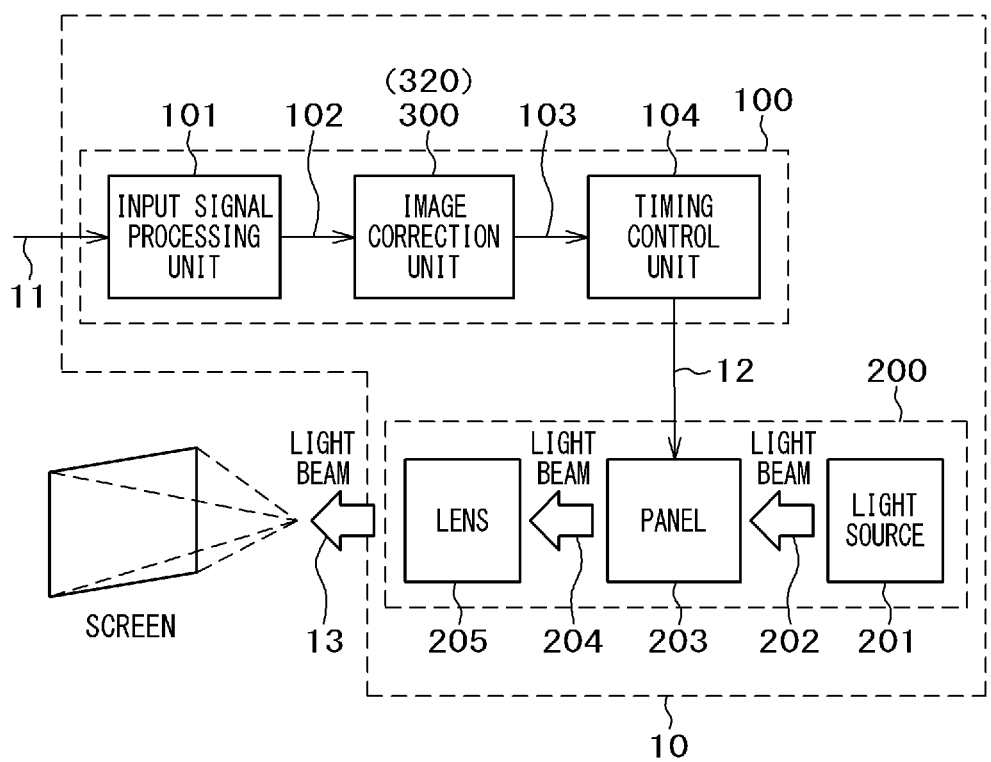
FIG. 1 is a diagram illustrating configurations of an image processing apparatus and an image display apparatus (liquid crystal projector).

First, typical configurations of the image processing apparatus and the image display apparatus will be described with reference to FIG. 1. According to this embodiment, as an example of the image processing apparatus and the image display apparatus, a liquid crystal projector will be described. FIG. 1 is a diagram illustrating configurations of the image processing apparatus and the image display apparatus (liquid crystal projector).

As illustrated in FIG. 1, the liquid crystal projector 10 includes an image processing apparatus 100 that receives an image input signal 11 output from a broadcast wave or a personal computer (PC) and processes an image signal, and an image display apparatus 200 that receives, as an input, a display control signal 12 for controlling liquid crystals of a liquid crystal display panel and processes an optical system for generating a projection image 13.

As illustrated in FIG. 1, the image processing apparatus 100 includes an image signal processing unit 101, an image correction unit 300, and a timing control unit 104.

The image signal processing unit 101 receives an image input signal 11 as an input and converts the image input signal into an internal image signal 102, for example, through a compressed image signal decoder, IP conversion, a scaler, keystone correction, and the like. The image correction unit 300 (320) receives the internal image signal 02 as an input and performs desired image correction. The timing control unit 104 receives the correction image signal 103 as an input and converts the correction image signal on the basis of horizontal and vertical synchronization signals of the display screen to generate a display control signal 12.

The image display apparatus 200 includes a light source 201, a liquid crystal display panel 203, and an adjustment lens 205.

The light source 201 is a xenon lamp or a metal halide lamp for generating light beams 202. The liquid crystal display panel 203 receives, as an input, the display control signal 15 output from the image processing apparatus 100 and creates a projection image by adjusting grayscales of the light beams 202 on a pixel basis. The lens 205 adjusts a focal point of the light beam 204 passing through the liquid crystal display panel 203.

[Theoretical Background on Image Processing]

Figure 2:
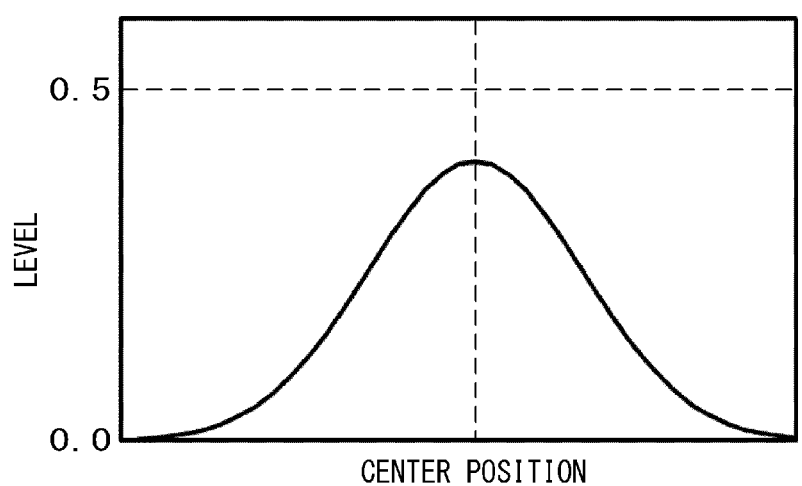
FIG. 2 is a Gaussian distribution graph in which an ordinate refers to a luminance level and an abscissa refers to a one-dimensional position coordinate.
Figure 3:
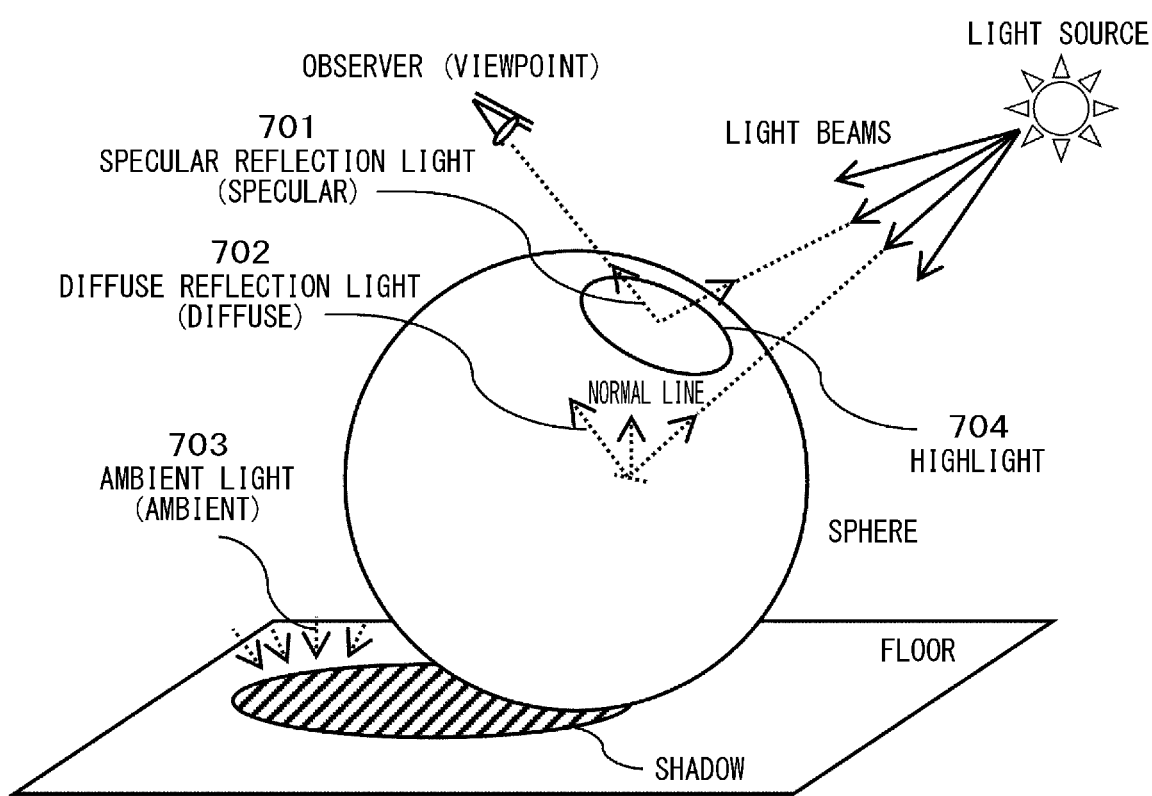
FIG. 3 is a diagram illustrating an exemplary Phong reflection model.
Figure 4A:
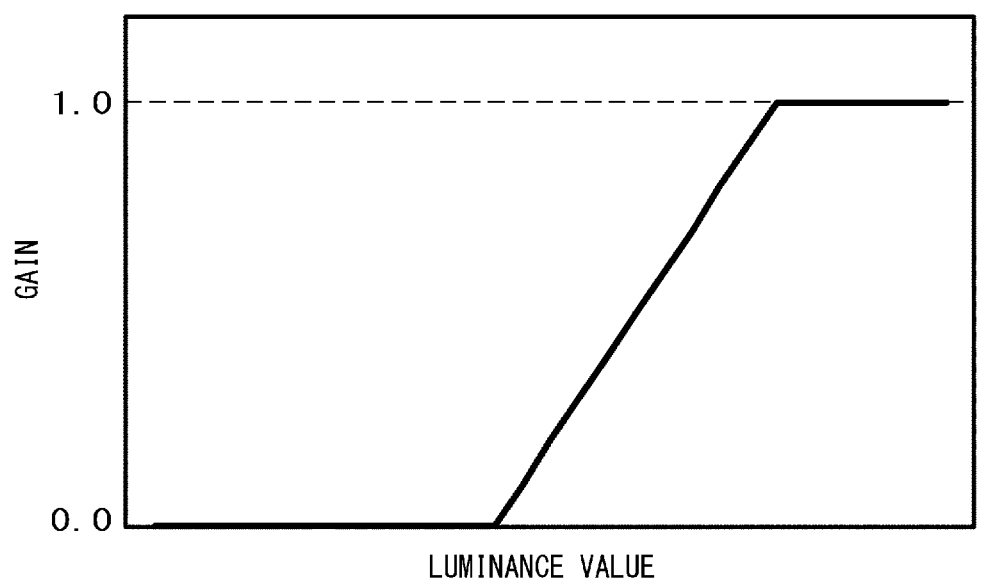
FIG. 4A is a diagram illustrating a correction gain for a specular component.
Figure 4B:
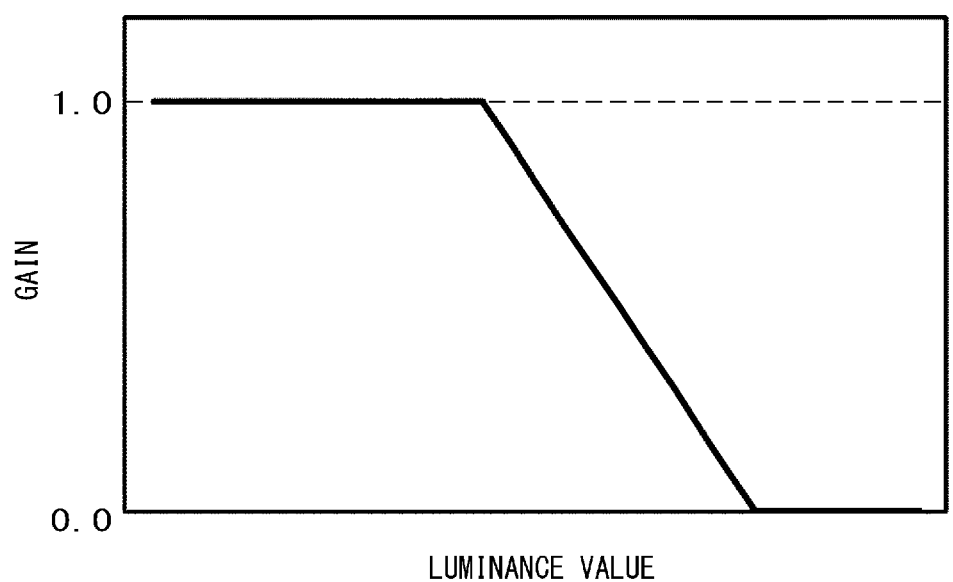
FIG. 4B is a diagram illustrating a correction gain for a diffuse component.
Figure 5A:
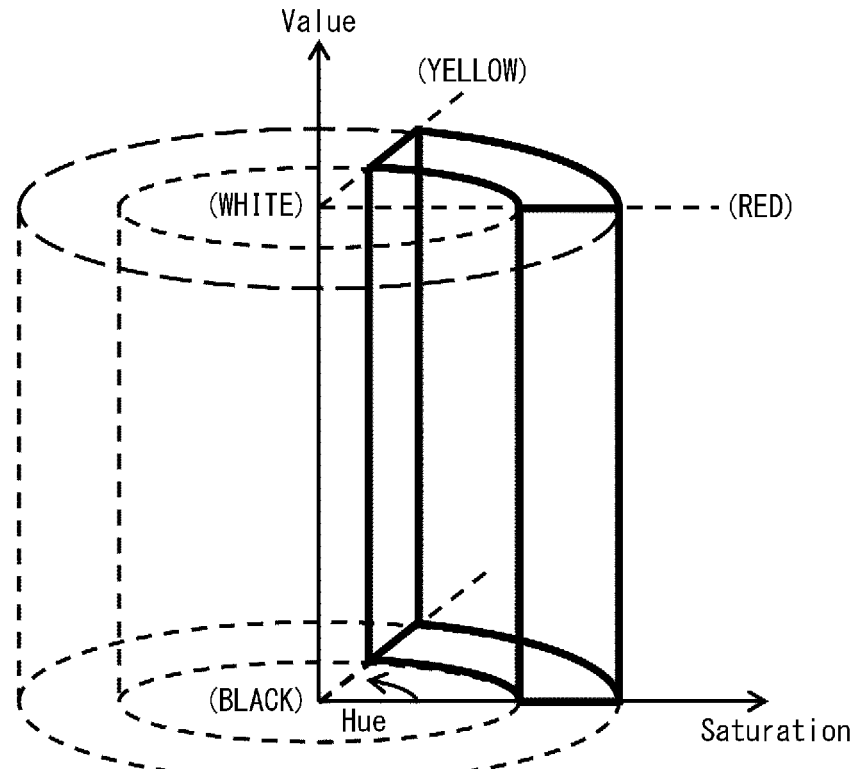
FIG. 5A is a diagram illustrating a HSV color space.
Figure 5B:
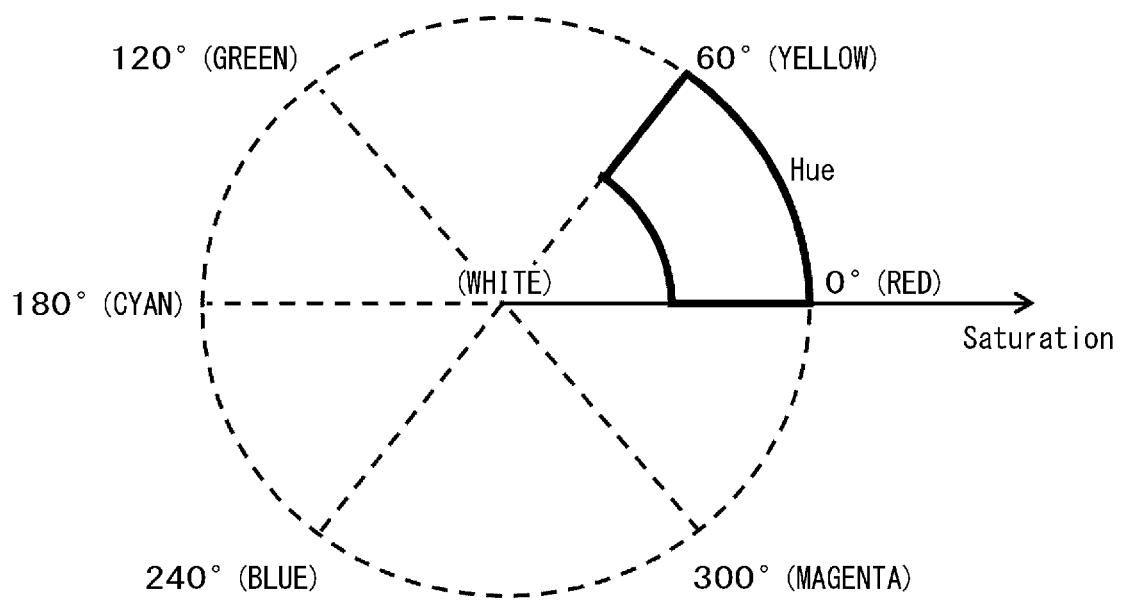
FIG. 5B is a diagram illustrating a relationship between hue and chroma in the HSV color space.
Figure 5C:
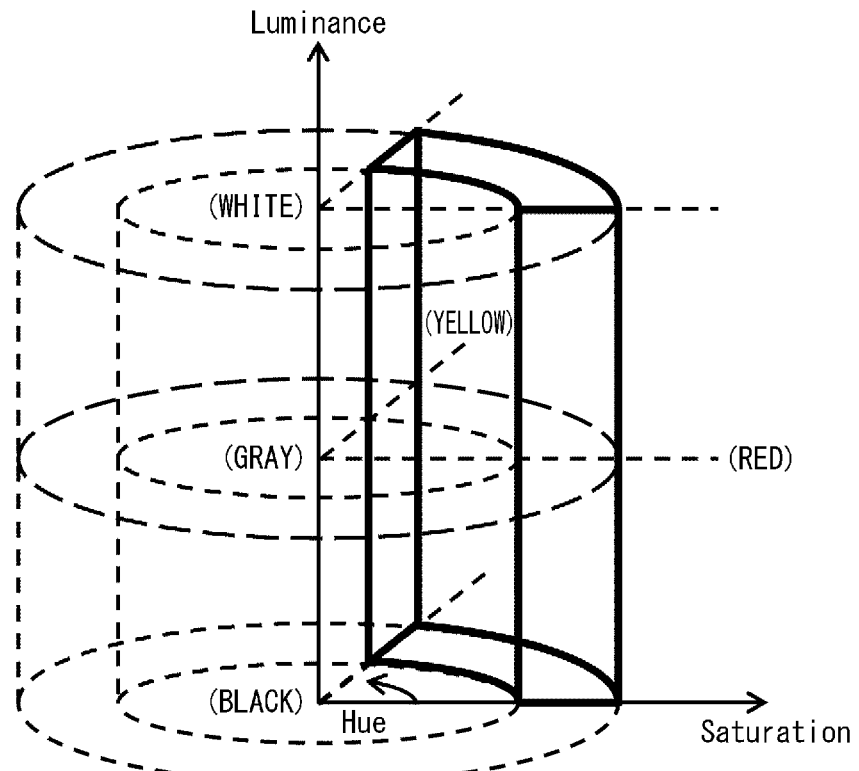
FIG. 5C is a diagram illustrating the HSL color space.
Figure 5D:
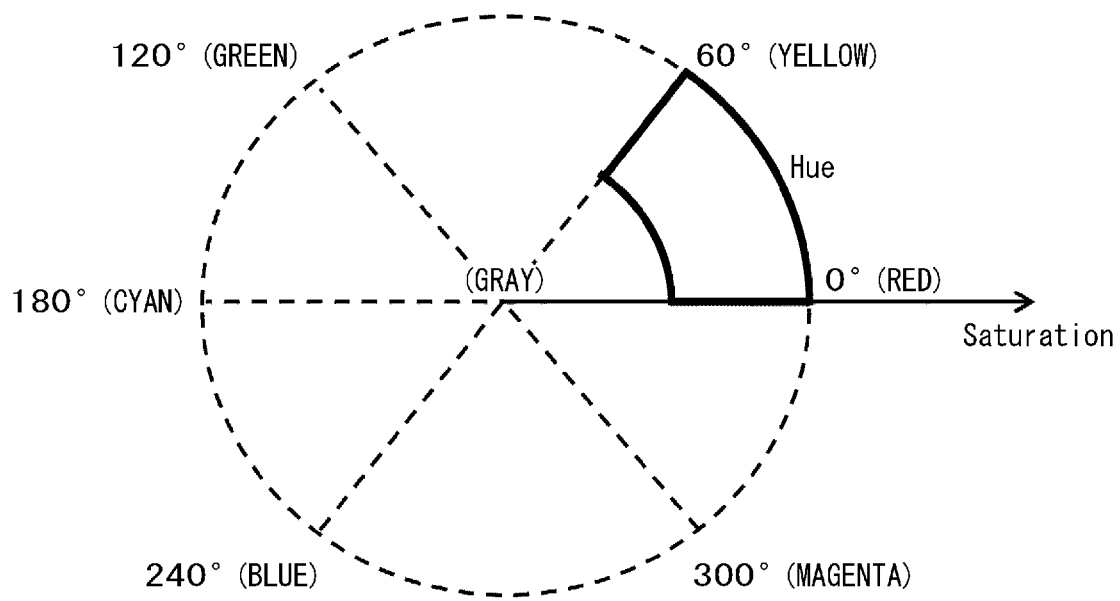
FIG. 5D is a diagram illustrating a relationship between hue and chroma in the HSL color space.

First, a theoretical background on the image processing will be described with reference to FIGS. 2 to 5D in order to facilitate understanding of the invention. FIG. 2 is a Gaussian distribution graph in which an ordinate refers to a luminance level, and an abscissa refers to a one-dimensional position coordinate. FIG. 3 is a diagram illustrating an exemplary Phong reflection model. FIG. 4A is a diagram illustrating a correction gain for a specular component. FIG. 4B is a diagram illustrating a correction gain for a diffuse component. FIG. 5A is a diagram illustrating a HSV color space. FIG. 5B is a diagram illustrating a relationship between hue and chroma in the HSV color space. FIG. 5C is a diagram illustrating the HSL color space. FIG. 5D is a diagram illustrating a relationship between hue and chroma in the HSL color space.

(I) Conventional Retinex Theory

As described above, the retinex theory explains human visual characteristics such as color constancy and lightness constancy. In this theory, it is possible to separate illumination light components from an image and extract reflection light components.

Here, in the retinex theory, an image I(x, y) of a certain pixel (x, y) is expressed as a product between illumination light L(x, y) and reflectivity r(x, y) so that a relationship "I(x, y)=L(x, y)·r(x, y)" can be established. Therefore, a concept of the retinex theory is to estimate illumination light L(x, y) using any means and restore an image of reflectivity from the relationship "I(x, y)=L(x, y)·r(x, y)".

In the center/surrounding (C/S) retinex, assuming that the factor L follows a Gaussian distribution centered at a target pixel in an image, a reflection light component R of a logarithmic space is obtained from a difference between the Gaussian distribution and the target pixel in the logarithmic space. Here, assuming that the luminance value of the target pixel is denoted by "I(x, y)", and the Gaussian distribution is denoted by F(x, y), the following Formula 1 is obtained.

[Formula 1]

$$R(x,y) = \log I(x,y) - \log[F(x,y) \otimes I(x,y)] \quad (1)$$

In Formula 1, a Gaussian distribution having a standard deviation σ with respect to an origin on a two-dimensional space is expressed as the following Formula 2. Here, since the standard deviation represents a spread of the Gaussian distribution, it is referred to as a "scale" hereinafter.

[Formula 2]

$$G_{\sigma^2}(x, y) = \frac{1}{2\pi\sigma^2} e^{-\frac{x^2+y^2}{2\sigma^2}} \quad (2)$$

Assuming that the ordinate refers to a luminance level, and the abscissa refers to a one-dimensional position coordinate, the Gaussian distribution is illustrated in FIG. 2. In this manner, it is recognized that the Gaussian distribution has a bell shape, so that the level decreases as the position becomes far from the center.

A product between F(x, y) and I(x, y) is called a convolution product, and is expressed as the following Formula 3.

[Formula 3]

$$f(x, y) \otimes g(x, y) \equiv \int\int_\Omega f(\sigma, \tau)g(x-\sigma, y-\tau)d\sigma d\tau \approx \quad (3)$$

$$\sum_{s=-L}^{L}\sum_{t=-L}^{L} f(s, t)g(x-s, y-t)$$

Here, "Ω" denotes an integration domain (R×R region) of a function (σ, τ), and the second formula is used to calculate an approximate value by assuming the integration domain has a rectangular shape, and dividing the integration domain horizontally and vertically by "2L".

Here, a model expressed by a single scale as in Formula 1 is referred to as a single scale retinex (SSR), and a model expressed by a plurality of scales is referred to as a multi-scale retinex (MSR). The MSR having "N" scales is expressed in the following Formula 4, in which the reflection light component of the (i)th SSR is synthesized with s a weight W.

[Formula 4]

$$R_{SSR,i}(x, y) = \log I(x, y) - \log[F_i(x, y) \otimes I(x, y)] \quad (4)$$

$$R_{MSR}(x, y) = \sum_{i=1}^{n} W_i R_{SSR,i}(x, y)$$

(II) Phong Reflection Model

Next, a Phong reflection model will be described with reference to FIG. 3.

The Phong reflective model is an illumination and shadow model for shadowing points on a modeled surface in the 3-dimensional computer graphics. The Phong reflection model is characterized in that reflection from the surface is classified into three items (specular reflection, diffuse reflection, and ambient reflection) for simple processing.

The elements of the model of FIG. 3 includes a light source, light beams extending from the light source, a sphere where the light beams arrive, a floor where the sphere is placed, and an observer who observes this situation. The observation may be performed at a position of the viewpoint using an actual human eye or an observation device such as a camera.

In FIG. 3, SPECULAR (specular reflection light) 701 refers to light of the light beams reflected on a spherical surface in a line-of-sight direction. This is the light source reflected on the spherical surface, and the circular highlight 704 in FIG. 3 is a range of the SPECULAR 701. For example, in the case of a plastic sphere, a small circular highlight having high luminance is generated. In addition, in the case of a rubber-like sphere, compared to the plastic sphere, a radius of the highlight is widened, and the luminance decreases. In the Phong reflection model, it is assumed that the SPECULAR follows power of the cosine of an angle between the reflection light and the line of sight.

In FIG. 3, DIFFUSE (diffuse reflection light) 702 refers to light generated by diffuse reflection of the light beams colliding with the spherical surface. The luminance of the diffuse reflection light 702 is determined by directions of the light beam and of the spherical surface, that is, the cosine of the angle between the light beam and the normal line, and a portion where the light directly strikes on the spherical surface is a range of the DIFFUSE 702.

In FIG. 3, AMBIENT (ambient reflection light) 703 is light which goes around a shadow portion. This ambient reflection light is light repeatedly reflected and scattered by the surrounding and is averaged throughout the environment. Therefore, even a shadow portion where light does not directly reach has a certain luminance. In the diffuse reflection light in the shadow, the brightness is determined by the directions of the light beam and the spherical surface, that is, the cosine of the angle between the light beam and the normal line.

Under the aforementioned assumption, in the Phong reflection model, the light intensity "I" at a certain point is expressed as the following Formula 5.

[Formula 5]

$$I = k_d \sum_{j=1}^{l} (\vec{N} \cdot \vec{L})I_d + k_s \sum_{j=1}^{m} (\vec{R} \cdot \vec{V})^n I_j + k_a I_a \quad (5)$$

Here, "$I_s$, $I_d$, and $I_a$" denote light intensities of SPECULAR (specular reflection light) 701, DIFFUSE (diffuse reflection light) 702, and AMBIENT (ambient reflection light) 703, respectively. In addition, "$k_s$, $k_d$, and $k_a$" denote a specular reflection component, a diffuse reflection component, and an ambient reflection coefficient, respectively. "L" denotes a direction vector from a point on an object surface to each light source. "N" denotes a normal vector on this point on the surface. "R" denotes a direction vector by which the light beam is perfectly reflected on that point of the surface. "V" denotes a direction vector directed to the viewpoint (such as a virtual camera). In addition, (*, *) denotes a vector scalar product. Furthermore, "n" denotes glossiness of that material and is a coefficient that determines a reflection ratio of the light reflected from a glossy point.

(II) Phong Reflection Model and Applied Retinex Theory Model

According to this embodiment, it is assumed that the aforementioned Phong reflection model is applied to the retinex theory by way of example.

Here, it is assumed that the Phong reflection model is employed, and the input of the reflection light component generator includes AMBIENT, DIFFUSE, and SPECULAR. In addition, it is assumed that the distribution of AMBIENT in the image follows a Gaussian distribution having a wide scale, the distribution of DIFFUSE follows a luminance distribution of the cosine against the light beam, and the distribution of SPECULAR follows a luminance distribution based on the power of the cosine of the angle with respect to the line of sight.

As a result, a filter of AMBIENT $F_a(x, y)$, a filter of DIFFUSE $F_d(x, y)$, and a filter of SPECULAR $F_s(x, y)$ can be expressed as Formulas 6, 7, and 8, respectively, as follows.

[Formula 6]

$$F_a(x, y) = \frac{1}{\sqrt{2\pi}\sigma} e^{-\frac{x^2+y^2}{2\sigma^2}} \quad (6)$$

[Formula 7]

$$F_d(x, y) = \cos\left(\frac{\pi\sqrt{x^2+y^2}}{k}\right) / N \quad (7)$$

[Formula 8]

$$F_s(x, y) = \cos^n\left(\frac{\pi\sqrt{x^2+y^2}}{k}\right) / V^n \quad (8)$$

In this case, an image $I_a$ obtained by the filter of AMBIENT contains almost only ambient components because of the averaging of overall light. An image $I_d$ obtained by the filter of DIFFUSE contains almost only ambient and diffuse components because of the averaging of specular components by the filter. In an image $I_d$ obtained by the filter of SPECULAR, most of the light is not averaged. Therefore, all of ambient, diffuse, and specular components are left. This state is expressed by the following Formula 9.

[Formula 9]

$$\text{Ambient}=I_a \text{ Diffuse}=I_d-I_a \text{ Specular}=I_s-I_d \quad (9)$$

As a result, logarithmic-space reflection components are calculated using the MSR, and the following Formula 10 is obtained.

[Formula 10]

$$R_{Phong,i}(x,y) = W_d R_{Diffuse,i}(x,y) + W_s R_{Specular,i}(x,y)$$

$$R_{Specular,i}(x,y) = \log \bar{I}_{s,i}(x,y) - \log \bar{I}_{d,i}(x,y) = \log[F_s(x,y) \otimes I(x,y)] - \log[F_d(x,y) \otimes I(x,y)]$$

$$R_{Diffuse,i}(x,y) = \log \bar{I}_{d,i}(x,y) - \log \bar{I}_{a,i}(x,y) = \log[F_d(x,y) \otimes I(x,y)] - \log[F_a(x,y) \otimes I(x,y)] \quad (10)$$

Here, "$R_{Phong,i}$, $R_{Specular,i}$, and $R_{Diffuse,i}$" denote required reflectivity, reflectivity of SPECULAR, and reflectivity of DIFFUSE, respectively. In addition, "$W_d$ and $W_s$" denote important coefficients for DIFFUSE and SPECULAR, respectively. Furthermore, the bars above the factors $I_s$, $I_d$, and $I_a$ represents a result of the convolution product between the filter components $F_s(x, y)$, $F_d(x, y)$, and $F_a(x, y)$ and the intensity I.

Since SPECULAR from a mirror, metal, or the like is considered to be total reflection, the power of the cosine becomes infinite. In this case, the reflection component caused by SPECULAR may also be expressed as the following Formula 11.

[Formula 11]

$$R_{Specular,i}(x,y) = \log I(x,y) - \log[F_d(x,y) \otimes I(x,y)] = \log I_i(x,y) - \log \bar{I}_{d,i}(x,y) \quad (11)$$

In the following description, it is assumed, in Formula 11, the function $F_s(x, y)$ is the Dirac's delta function $\delta(x, y)$.

In many cases, SPECULAR is conspicuous highlight and has high luminance, and DIFFUSE has middle or low luminance. In this regard, for example, a gain of a high luminance region illustrated in FIG. 4A may be added to the specular component $R_{Specular,i}$ of Formula 10, and a gain of a middle or low luminance region illustrated in FIG. 4B may be added to the diffuse component $R_{Diffuse,i}$. Here, referring to an input/output characteristic curve g(I) of FIG. 4A, the gain becomes zero when the input luminance I is low. In addition, the gain slowly increases from the middle luminance, and the gain becomes 1 in the high luminance. The input/output characteristic curve of FIG. 4B can be expressed as "1−g(I)". The gain becomes "1" in the low luminance, and the gain slowly decreases from the middle luminance, and becomes zero in the high luminance.

Similar to the MSR, Formula 10 expresses reflectivity of a homomorphic filter when adding a gain and an exponential function after execution of the weighted averaging. For this homomorphic filter, the logarithmic and exponential functions of the illumination light integrator may be approximated, for example, to a power function and its inverse function. In this case, assuming that "f" denotes a function, the following Formula 12 is obtained.

[Formula 12]

$$R_{Phong,i}(x,y) = W_d R_{Diffuse,i}(x,y) + W_s R_{Specular,i}(x,y)$$

$$R_{Specular,i}(x,y) = f(F_s(x,y) \otimes I(x,y)) - f(F_d(x,y) \otimes I(x,y)) = f(\bar{I}_{s,i}(x,y)) - f(\bar{I}_{d,i}(x,y))$$

$$R_{Diffuse,i}(x,y)=f(F_d(x,y)\otimes I(x,y))-f(F_a(x,y)\otimes I(x,y))=f(\bar{I}_{d,i}(x,y))-f(\bar{I}_{a,i}(x,y)) \quad (12)$$

(III) HSV Color Space and HSL Color Space

Next, a HSV color space and a HSL color space will be described with reference to FIGS. 5A to 5D.

As illustrated in FIG. 5A, the HSV color space is a three-dimensional color space (cylinder model) in which an axial direction refers to lightness (value), a rotation direction refers to hue, and a radial direction refers to chroma (saturation). The color becomes bright as the lightness increases. The color becomes dark as the lightness decreases. The color becomes thick as the chroma increases. The color becomes thin as the chroma decreases. FIG. 5B is a diagram illustrating a relationship between hue and chroma at a lightness of 100%. The hue changes from the red to the yellow, to the green, to the cyan, to the blue, and to the magenta at every 60° around the circumference and returns to the red. The origin is white, and, for example, a vector having a chroma value of 100% and an angle of 0° is red. Note that all vectors having a lightness value of 0% are black.

Meanwhile, the HSL color space is a three-dimensional color space (cylindrical model) in which an axial direction refers to luminance, a rotation direction refers to hue, and a radial direction refers to chroma (saturation). The luminance indicates a relationship between the hue and the chroma on a slice of the gray color. Similar to the HSV color space, the hue changes from the red to the yellow, to the green, to the cyan, to the blue, and to the magenta at every 60° around the circumference and returns to the red. The origin is white, and for example, a vector having a chroma value of 100% and an angle of 0° is red. Note that all vectors having a lightness value of 0% are black.

Note that the HSL color space is different from the HSV color space in that colors arranged in the luminance 100% slice are all white in the HSL color space.

[Image Correction Unit of Image Processing Apparatus of the Related Art]

Figure 6:
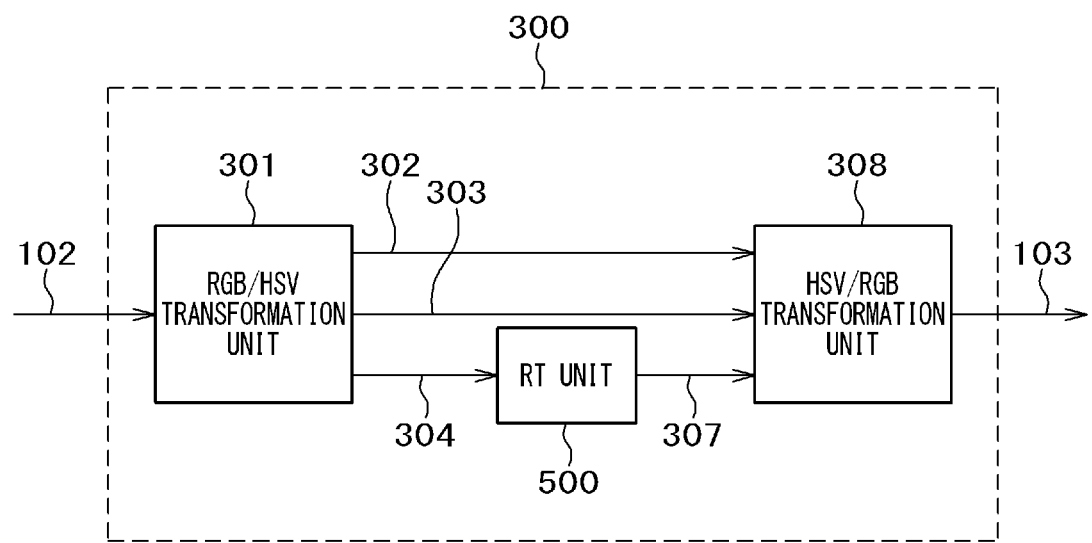
FIG. 6 is a block diagram illustrating an image correction unit 300 of an image processing apparatus of the related art.
Figure 7:
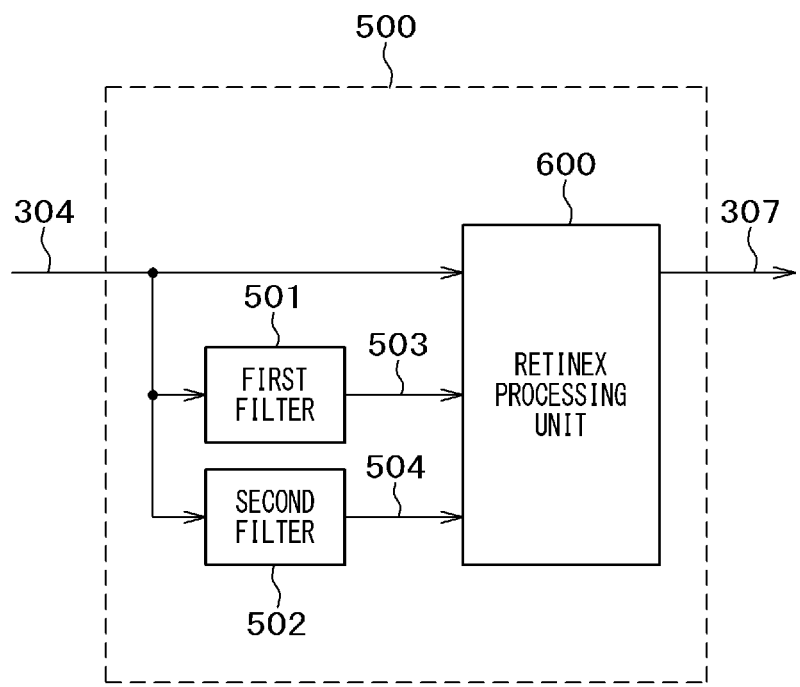
FIG. 7 is a block diagram illustrating an RT unit 500 of the image processing apparatus of the related art.
Figure 8:
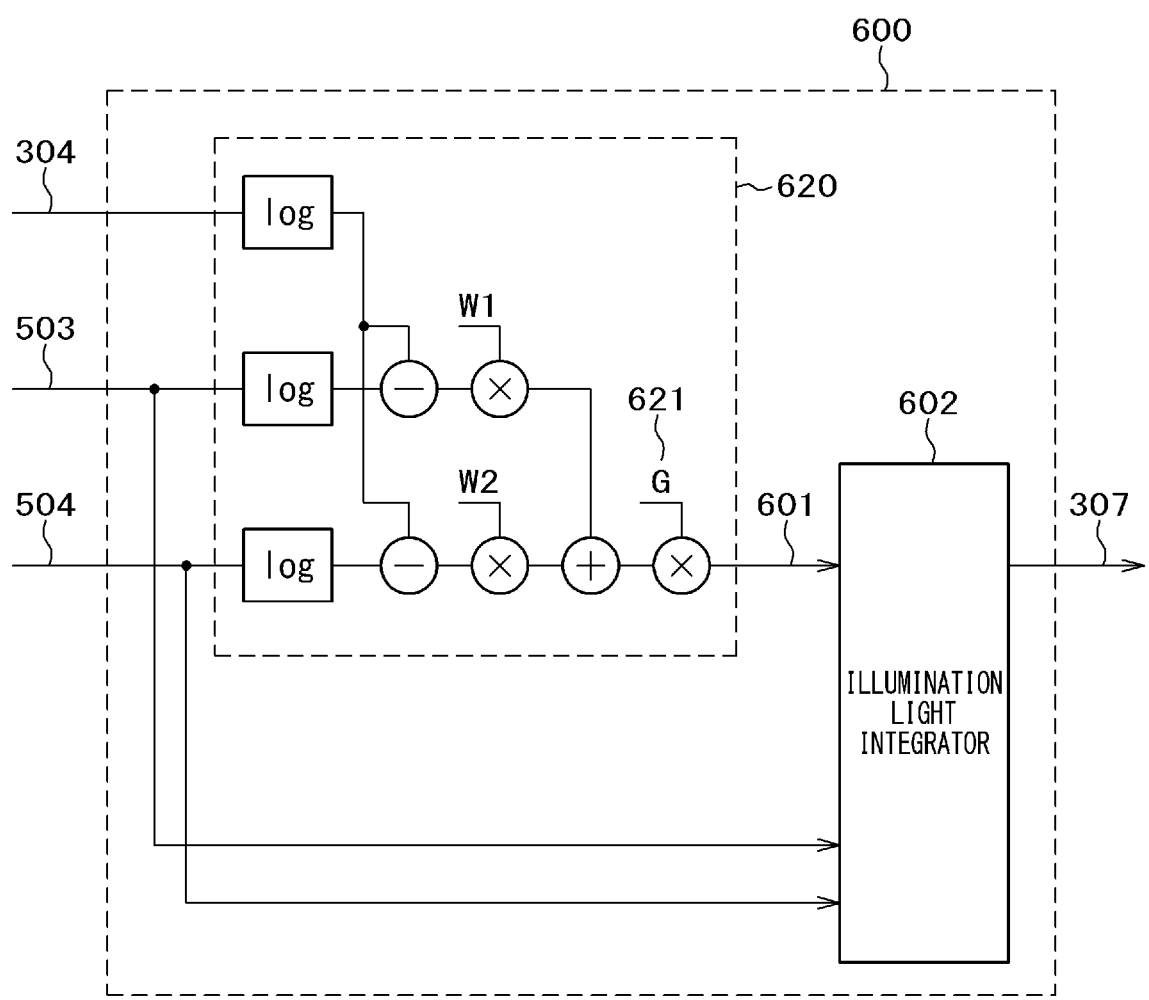
FIG. 8 is a block diagram illustrating a retinex processing unit 600 of the RT unit 500.

Next, an image correction unit of an image processing apparatus of the related art will be described with reference to FIGS. 6 to 8. FIG. 6 is a block diagram illustrating an image correction unit 300 of an image processing apparatus of the related art. FIG. 7 is a block diagram illustrating an RT unit of the image processing apparatus of the related art. FIG. 8 is a block diagram illustrating a retinex processing unit 600 of the RT unit 500.

As illustrated in FIG. 6, the image correction unit 300 of the related art has an RGB-HSV transformation unit 301, an RGB-RT unit 500, and a HSV-RGB transformation unit 308.

The RGB-HSV transformation unit 301 receives an image signal 102 having RGB components as an input and transforms the RGB signal into HSV color signal. The RT (retinex) unit 500 receives, as an input, the lightness (value) signal 304 output from the RGB-HSV transformation unit and performs local contrast correction through retinex processing. The HSV-RGB transformation unit 308 receives, as an input, three HSV correction signals including the lightness correction signal 307 output from the RT unit 500, the hue signal 302, and the chroma (saturation) signal 303 and outputs the correction image signal 103 by restoring from the HSV color space to the RGB color space.

Next, the RT unit 500 will be described in more details with reference to FIG. 7.

Here, the RT unit 500 performs image correction using retinex processing on the basis of Formula 4 in the theoretical background regarding the image processing described above. As a model, it is assumed that the MSR consists of a pair of SSRs.

As illustrated in FIG. 7, the RT unit 500 includes first and second filter units 501 and 502 having different scales, and a retinex processing unit 600.

The first and second filter units 501 and 502 receive the lightness signal 304 as an input and outputs first and second filter output signals 503 and 504, respectively. Here, the first filter unit 501 has a smaller scale, and the second filter unit 502 has a larger scale. In addition, the first and second filter units 501 and 502 implement Gaussian distributions of places for obtaining convolution products between Gaussian distributions having scales of 1 (i=1) and 2 (i=2), respectively, and the lightness (corresponding to the image I of Formula 1).

The retinex processing unit 600 receives, as an input, the lightness signal 304, the first filter output signal 503, and the second filter output signal 504 and outputs the lightness correction signal 307 on the basis of the MSR model computation.

Next, the retinex processing unit 600 of the RT unit 500 will be described in details with reference to FIG. 8.

As illustrated in FIG. 8, the retinex processing unit 600 includes a reflection light component generator 620 and an illumination light integrator 602.

The reflection light component generator 620 receives the lightness signal 304 and the filter output signals 503 and 504 and outputs a reflection light component 601. Internally, Formula 4 regarding the MSR for a pair of scales is calculated, and a gain G621 is applied. That is, as the reflection light component 601, the gain G621 is applied, and the $R_{MSR}(x, y)$ is output.

The illumination light integrator 602 integrates reflectivity obtained by exponentiating the reflection light component 601 and the illumination light. That is, $L(x, y) \cdot R(x, y)$ in the explanation of the theoretical background regarding the image processing is obtained.

[Image Correction Unit of Image Processing Apparatus of First Embodiment]

Figure 9:
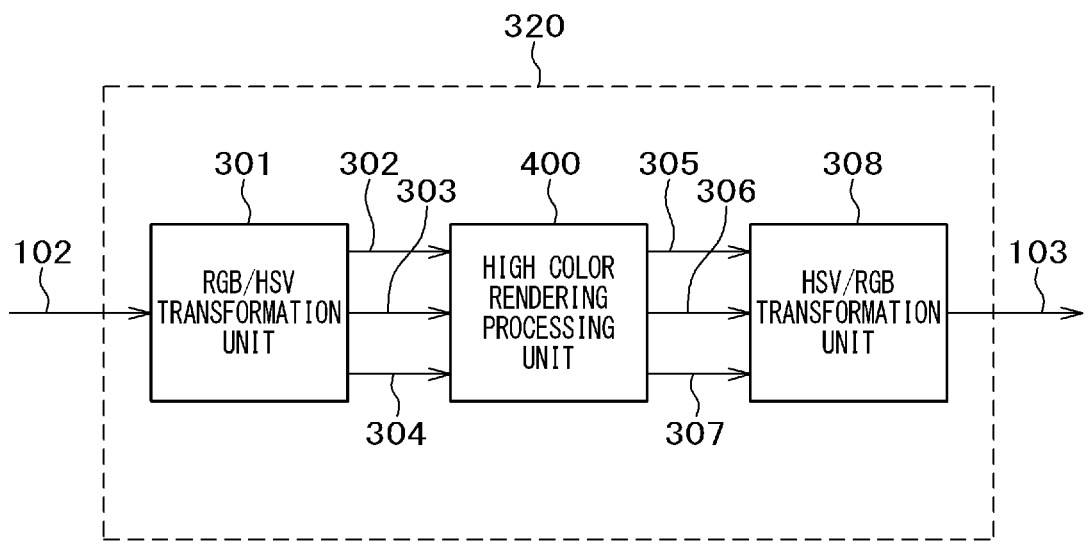
FIG. 9 is a block diagram illustrating an image correction unit 320 of an image processing apparatus according to a first embodiment of the invention.
Figure 10:
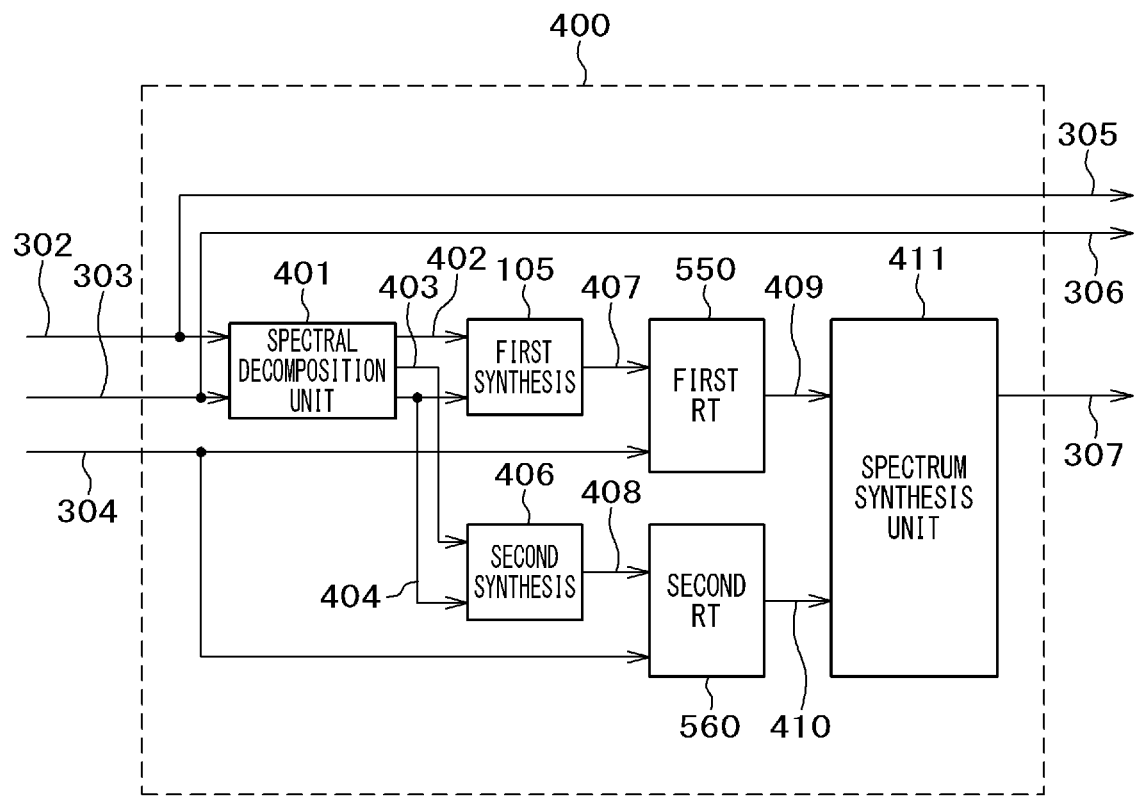
FIG. 10 is a block diagram illustrating a high rendering color processing unit 400 according to the first embodiment of the invention.
Figure 11:
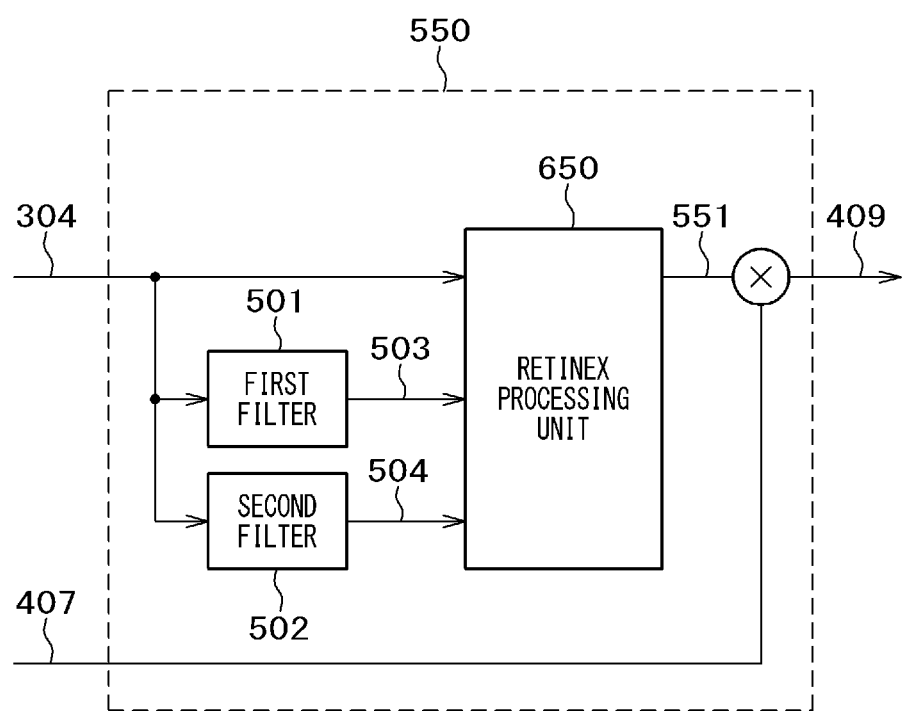
FIG. 11 is a block diagram illustrating an RT unit 550 of the high rendering color processing unit 400.
Figure 12:
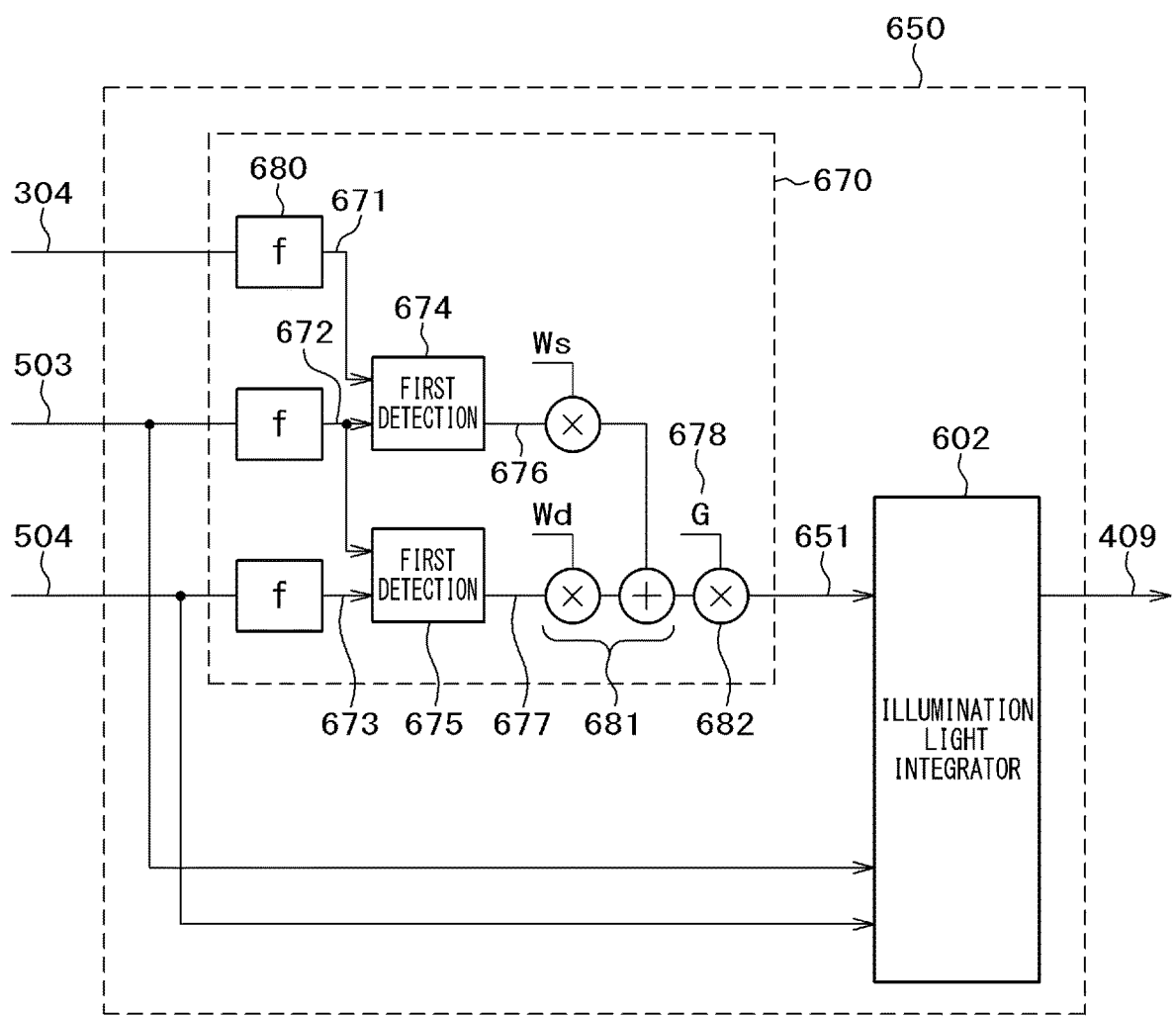
FIG. 12 is a block diagram illustrating a retinex processing unit 650 of the RT unit 550.

Next, an image correction unit of an image processing apparatus according to the first embodiment of the invention will be described with reference to FIGS. 9 to 12. FIG. 9 is a block diagram illustrating an image correction unit 320 of the image processing apparatus according to the first embodiment of the invention. FIG. 10 is a block diagram illustrating a high rendering color processing unit 400 according to the first embodiment of the invention. FIG. 11 is a block diagram illustrating an RT unit 550 of the high rendering color processing unit 400. FIG. 12 is a block diagram illustrating a retinex processing unit 650 of the RT unit 550.

The image processing apparatus according to the first embodiment of the invention is obtained by applying the retinex theory and the Phong reflection model in the theoretical background regarding the image processing described above.

In the image processing apparatus according to the first embodiment of the invention, the image correction unit 300 of FIG. 1 (of the related art) is substituted with the image correction unit 320.

The image correction unit 320 according to this embodiment includes an RGB-HSV transformation unit 301, a high rendering color processing unit 400, and an HSV-RGB transformation unit 308.

The RGB-HSV transformation unit 301 receives the image signal 102 having RGB components as an input and transforms the RGB signal into the HSV color space signal. The high rendering color processing unit 400 receives three HSV signals including the hue signal 302 output from the RGB-HSV transformation unit 301, a chroma (saturation) signal 303, and a lightness (value) signal 304, and performs local contrast correction based on the retinex theory. The HSV-RGB transformation unit 308 receives the three HSV correction signals including the hue correction signal 305, the chroma correction signal 306, and the lightness correction signal 307 output from the high rendering color processing unit 400 as an input and outputs the correction image signal 103 by returning from the HSV color space to the RGB color space.

Next, the high rendering color processing unit 400 will be described in details with reference to FIG. 10.

The high rendering color processing unit 400 includes a spectral decomposition unit 401, a first synthesis unit 405, a second synthesis unit 406, a first RT unit 550, a second RT unit 560, and a spectrum synthesis unit 411.

The spectral decomposition unit 401 receives the hue signal 302 and the chroma signal 303 as an input, performs spectral decomposition depending on color, and outputs each of the hue gain signal (including the first and second hue gain signals 402 and 403) and the chroma gain signal 404. The first synthesis unit 405 receives the first hue gain signal 402 and the chroma gain signal 404 output from the spectral decomposition unit 401 as an input and synthesizes a pair of gain signals by integrating them or using a minimum value calculation. Similarly, the second synthesis unit 406 receives the second hue gain signal 403 and the chroma gain signal 404 as an input and synthesizes the two gain signals. The first RT unit 550 receives, as an input, the first synthesis gain signal 407 output from the first synthesis unit 405 and the lightness signal 304, performs retinex processing, and outputs the first lightness correction signal 409. The second RT unit 560 receives, as an input, the second synthesis gain signal 408 output from the second synthesis unit 406 and the lightness signal 304, performs retinex processing, and outputs the second lightness correction signal 409. The spectrum synthesis unit 411 receives, as an input, the first lightness correction signal 409 output from the first RT unit and the second lightness correction signal 410 output from the second RT unit and outputs the lightness correction signal 307 by adding the two lightness signals.

Note that, in the high rendering color processing unit 400, the input hue signal 302 and the input chroma signal 303 are directly output as the hue signal 305 and the chroma signal 306.

Next, the RT unit 550 will be described in more details with reference to FIG. 11 (this similarly applies to the RT unit 560).

As illustrated in FIG. 11, the RT unit 550 includes first and second filter units 501 and 502 having different scales and a retinex processing unit 600.

The first and second filter units 501 and 502 receives the lightness signal 304 as an input and outputs filter output signals 503 and 504, respectively. Here, the first filter unit 501 has a smaller scale, and the second filter unit 502 has a larger scale. In addition, the first and second filter units 501 and 502 implement Gaussian distributions of places for obtaining convolution products between Gaussian distributions having scales of 1 (i=1) and 2 (i=2), respectively, and the lightness (corresponding to the image I of Formula 1).

The retinex processing unit 650 receives, as an input, the lightness signal 304 and the filter output signals 503 and 504 and outputs the lightness correction signal 551 through computation based on the Phong reflection model described above in the theoretical background regarding the image processing and the retinex theory applied model.

The RT unit 550 multiplies the lightness correction signal 551 from the retinex processing unit 650 by a gain of the first synthesis gain signal 407 depending on the hue and the chroma (saturation) decomposed for each spectrum and outputs the result.

Note that the RT unit 560 is similar to the RT unit 550 except that the second synthesis gain signal 408 and the lightness signal 304 are input, and the second lightness correction signal 410 is output.

Next, the retinex processing unit 650 will be described with reference to FIG. 12.

The retinex processing unit 650 performs the signal processor corresponding to Formula 12 described above in the theoretical background regarding the image processing.

The retinex processing unit 650 includes a reflection light component generator 670 and an illumination light integrator 602.

The reflection light component generator 670 receives, as an input, the lightness signal 304 and the first and second filter output signals 503 and 504, and outputs the reflection light component 651. The illumination light integrator 602 receives, as an input, the reflection light component 651 and the first and second filter output signals 503 and 504, and outputs the retinex correction signal 409.

The first and second filter output signals 503 and 504 are output signals of the first and second filter units 503 and 504, respectively, of FIG. 4B. The first filter unit 501 computes a distribution of DIFFUSE (diffuse reflection light) and, the second filter unit 502 computes a distribution of AMBIENT (ambient reflection light).

The reflection light component generator 670 applies a gain G678 to the computation result $R_{Phong, j}(x, y)$ of Formula 12 and includes a function (f) applying unit 680, a first detection unit 674, a second detection unit 675, a product-sum operation unit 681, and a gain multiplier 682. The function (f) applying unit 680 applies a function f (logarithmic function or exponential function) to the input signal. The first detection unit 674 receives a distribution 671 of SPECULAR based on the function f from the lightness signal 304 and a distribution 672 of DIFFUSE based on the function f as an input and detects SPECULAR (specular reflection light). The second detection unit 675 receives a distribution 672 of DIFFUSE based on the function f and distribution 673 of AMBIENT based on the function f as an input and detects DIFFUSE. The product-sum operation unit 681 is a computation unit that multiplies the weight operators Ws and Wd by the specular component 676 and the diffuse component 677 and obtains a sum thereof. The gain multiplier 682 is a computation unit that multiples the computed reflectivity by a gain G678.

Alternatively, the first detection unit 674 may apply the luminance characteristic of FIG. 4A to the first detection unit 674 and apply the luminance characteristic of FIG. 4B to the second detection unit 675.

The illumination light integrator 602 integrates the reflectivity obtained by converting the reflection light component 651 into an inverse function of the function f (exponentiation or extraction of the exponent) and the illumination light and integrates the illumination light. That is, the illumination light integrator 602 obtains "L(x, y)·r(x, y)" initially described in the theoretical background regarding the image processing.

[Relationship Between Spectral Decomposition and Hue Gain in High Rendering Color Processing Unit of First Embodiment]

Figure 13A:
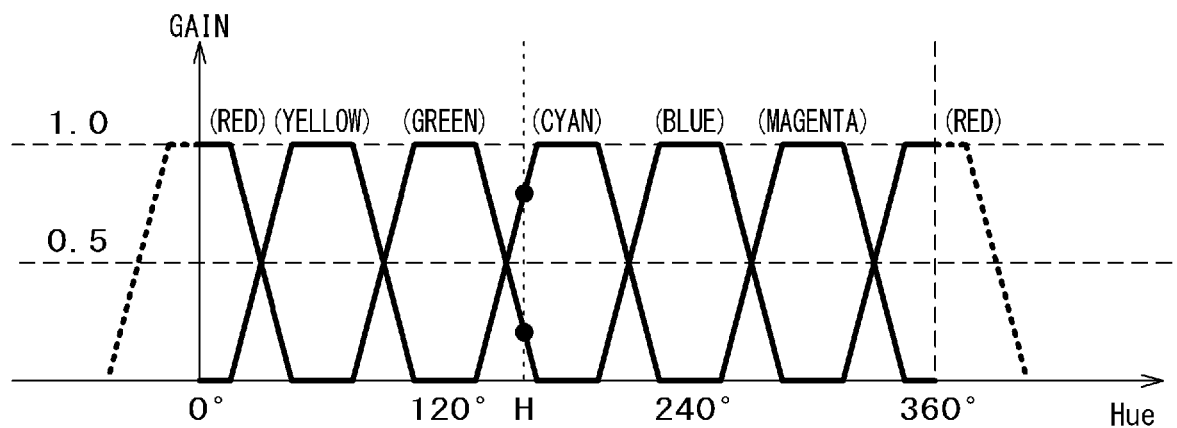
FIG. 13A is a graph illustrating a relationship between a spectral decomposition and a hue gain (trapezoidal model).
Figure 13B:
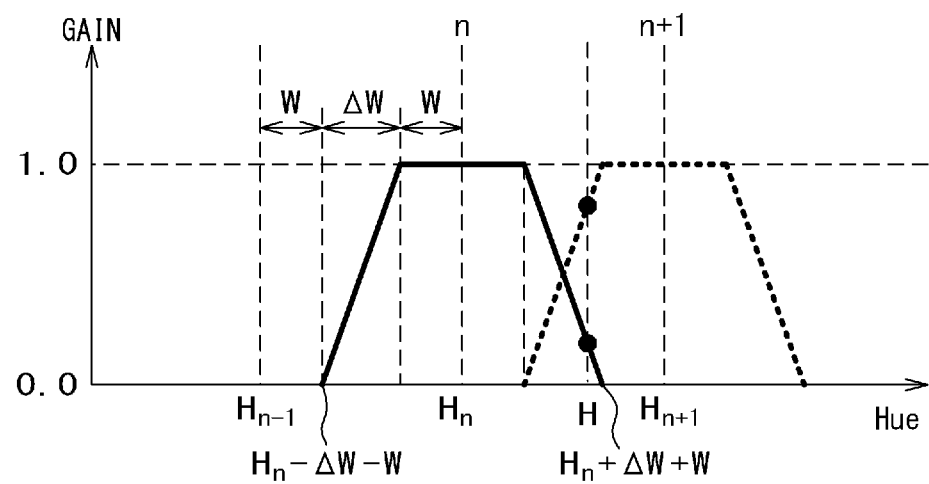
FIG. 13B is a graph illustrating the relationship of the trapezoidal model of FIG. 13A in more details.
Figure 14A:
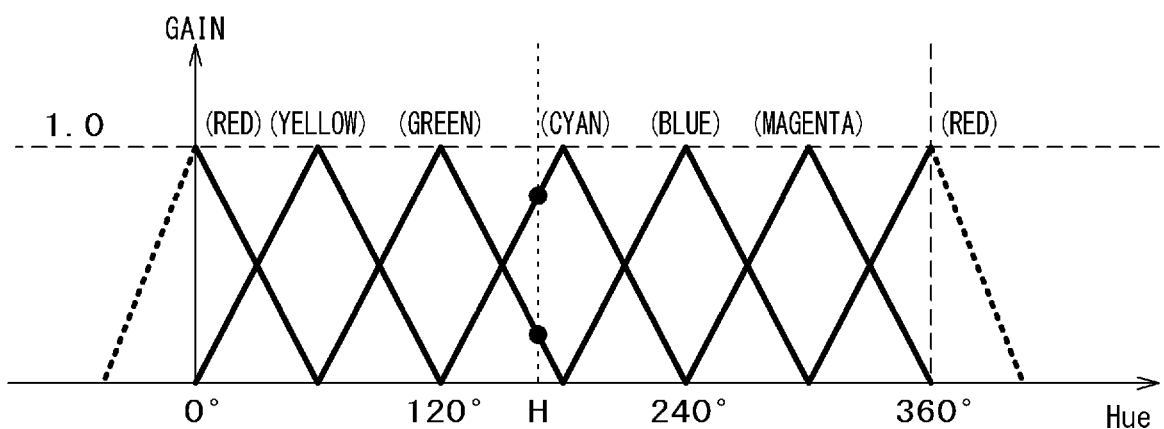
FIG. 14A is a graph illustrating a relationship between a spectral decomposition and a hue gain (triangular model).
Figure 14B:
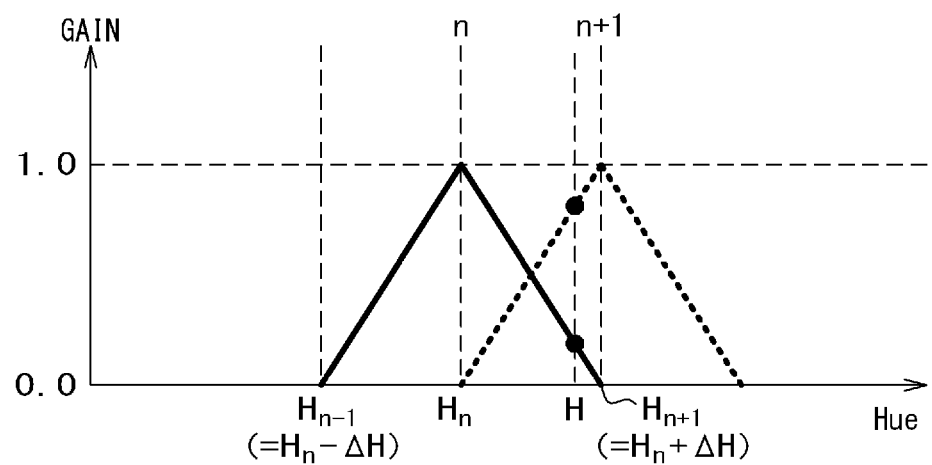
FIG. 14B is a graph illustrating the relationship of the triangular model of FIG. 14A in more details.

Next, a relationship between a spectral decomposition and a hue gain in the high rendering color processing unit will be described with reference to FIGS. 13A to 14B. FIG. 13A is a graph illustrating a relationship between the spectral decomposition and the hue gain (trapezoidal model). FIG. 13B is a graph illustrating the relationship of the trapezoidal model of FIG. 13A in more details. FIG. 14A is a graph illustrating a relationship between a spectral decomposition and a hue gain (triangular model). FIG. 14B is a graph illustrating the relationship of the triangular model of FIG. 14A in more details.

In the HSV color space, for example, when the hue is segmented into N colors (n=0, 1, . . . , n−1), and the hue gain is applied to each color, the spectral decomposition unit 401 of FIG. 10 may determine the hue gain corresponding to the hue value such that a sum of the hue gains of each spectral distribution becomes "1.0".

For example, when the hue is decomposed into six color spectra (red, yellow, green, cyan, blue, and magenta), a relationship of FIG. 13A is obtained by applying a relationship between the hue and the hue gain expressed in a trapezoidal shape of FIG. 13B and equally dividing the hue into six segments (N=6).

In addition, the relationship of FIG. 14A is obtained by applying a relationship between the hue and the hue gain expressed in a triangular shape of FIG. 14B and equally dividing the hue into eight segments.

In FIG. 13B, a value of the hue gain of the hue H between the (n)th spectrum and the (n+1)th spectrum is an overlap of the hue gain between each spectrum, and can be expressed as Formula 13 where "W" denotes a half of an upper base of the isosceles trapezoid, and "ΔW" denotes "(lower base−upper base)/2". Note that a range of H is set to "[Hn, Hn+1]".

[Formula 13]

$$G_n(H) = \frac{-1}{\Delta W}(H - H_{n+1} - W - \Delta W), H_{n+1} > H \geq H_n \quad (13)$$

$$G_{n+1}(H) = \frac{1}{\Delta W}(H - H_n + W + \Delta W), H_{n+1} > H \geq H_n$$

$$H_{n+1} = H_n + \Delta H$$

Similarly, in FIG. 14B, a value of the hue gain of the hue H between the (n)th spectrum and the (n+1)th spectrum is expressed as Formula 14, where ΔH denotes a half of the lower base of the isosceles triangle.

[Formula 14]

$$G_n(H) = \frac{1}{\Delta H}(H - H_{n+1}), H_{n+1} > H \geq H_n \quad (14)$$

$$G_{n+1}(H) = \frac{1}{\Delta H}(H - H_n), H_{n+1} > H \geq H_n$$

$$H_{n+1} = H_n + \Delta H$$

If all of the formulas satisfy the following Formula 15, and they are synthesized, the white color is obtained (that is, lightness (value)=100%.

[Formula 15]

$$G(H) = G_n(H) + G_{n+1}(H) = 1.0, H_{n+1} > H \geq H_n \quad (15)$$

Here, for simplicity purposes, it is assumed that two spectra are synthesized, and a hue gain function has a horizontal isotropic distribution. Alternatively, any distribution may be employed as long as the sum of the hue gains of the decomposed hue becomes 1.0 (100%).

Although the two overlapping portions exist in the spectral distribution in the aforementioned description, a plurality of overlapping portions may also be formed. In this case, the high rendering color processing unit 400 necessarily has a plurality of RT units.

According to the first embodiment, the hue gain corresponding to the hue is created using the spectral distribution on the basis of the aforementioned principle. Alternatively, the hue gain may also be selected from a user menu.

[Relationship Between Spectral Decomposition and Chroma Gain in High Rendering Color Processing Unit of First Embodiment]

Next, a relationship between the spectral decomposition and the chroma gain in the high rendering color processing unit will be described with reference to FIGS. 15A to 15C.

Figure 15A:
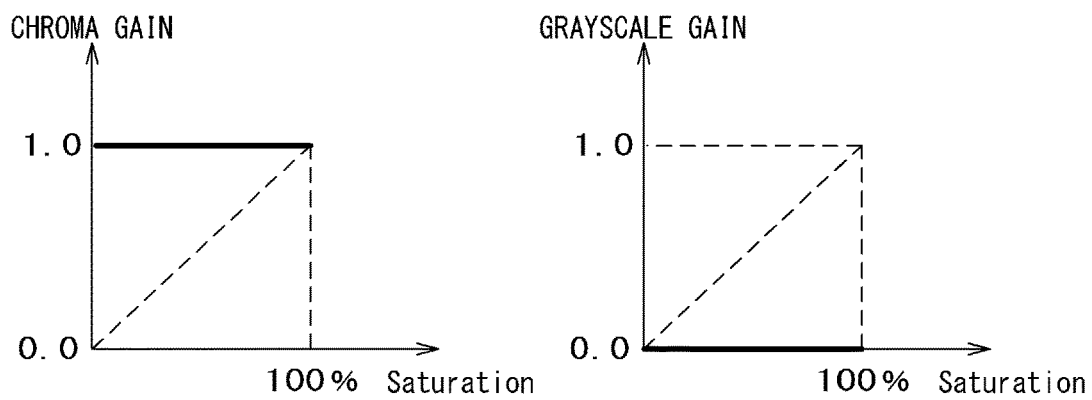
FIG. 15A is a (first) graph illustrating a relationship between chroma and a chroma gain (grayscale gain).
Figure 15B:
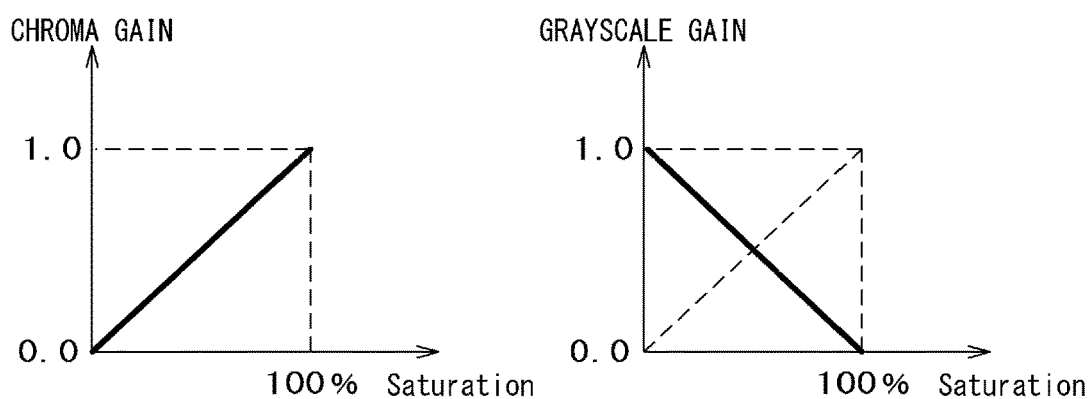
FIG. 15B is a (second) graph illustrating the relationship between the chroma and the chroma gain (grayscale gain).
Figure 15C:
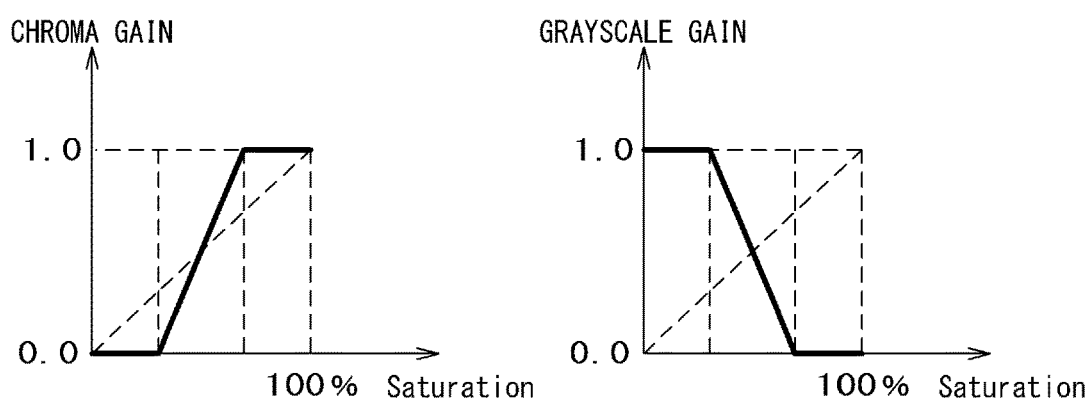
FIG. 15C is a (third) graph illustrating a relationship between the chroma and the chroma gain (grayscale gain).

The spectral decomposition unit 401 of FIG. 10 may output the chroma gain signal in the HSV color space as illustrated in FIGS. 15A to 15C.

FIGS. 15A to 15C are graphs illustrating a relationship between chroma and a chroma gain (grayscale gain).

FIG. 15A illustrates an exemplary gain when the chroma gain is set to "1.0", that is, when an adaptive control is not performed for the chroma. FIG. 15B illustrates an exemplary setting for increasing the chroma gain in response to an increase of the chroma. This is to protect a low chroma region of an image because a variation of the hue occurs in the low chroma region of an image in many cases, and color noise is generated through the retinex processing. FIG. 15C illustrates an example in which a non-correction region and a 100% gain region are provided in the low chroma side.

According to the first embodiment, the chroma gain corresponding to the chroma is created using the spectral distribution on the basis of the aforementioned principle. Alternatively, the hue gain may be selected from a user menu.

[Comparison of Retinex Processing Between Related Art and First Embodiment]

Figure 16:
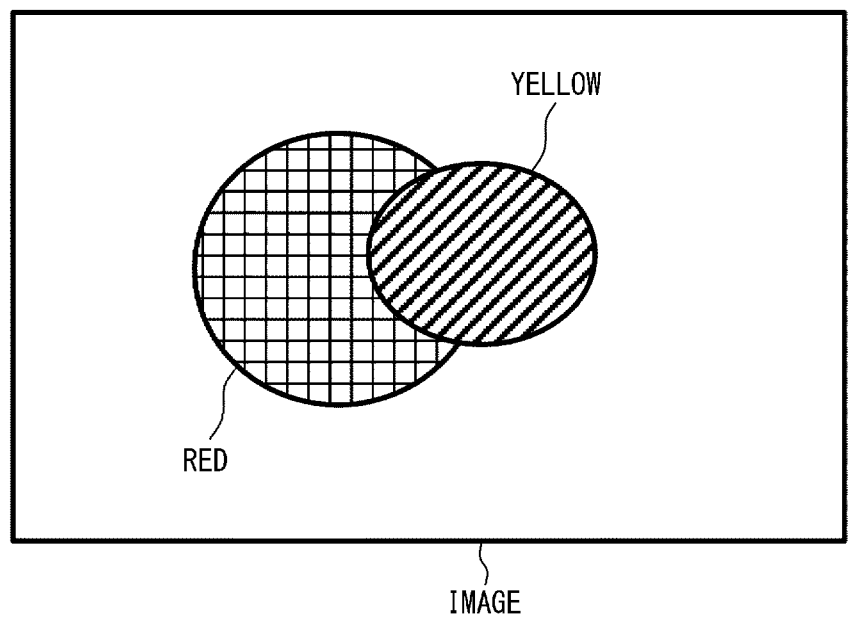
FIG. 16 is a schematic diagram illustrating a case where there are red and yellow objects in an image.

Next, the retinex processing of the related art and the retinex processing of the first embodiment will be compared with reference to FIG. 16. FIG. 16 is a schematic diagram illustrating a case where there are red and yellow objects in an image.

As illustrated in FIG. 6, the lightness signal is employed in the retinex processing based on the HSV color space in many cases. In this case, the retinex processing is performed only for the brightness, and the color is neglected. That is, the colors having the same brightness are not processed even when there is a difference in color.

When the retinex processing is performed in the RGB color space without transformation to the HSV color space, in general, each component of the RGB signal is processed, and a correlation of each component of the RGB is then obtained. For example, a balance of the red signal is obtained using "R/(R+G+B)" or the like. However, in this method, basically, the correction amount is determined only depending on magnitudes of three individual spectra even when the RGB colors are not balanced.

For example, as illustrated in FIG. 16, it is assumed that there are red and yellow objects in an image. In this case, for example, it is assumed that the red component is set to "(R, G, B)=(255, 0, 0)", and the yellow component is set to "(R, G, B)=(255, 255, 0)". For such an object, in the processing of the red color, the yellow color is treated in the same way as that of the red color, and they are not distinguished at all. However, in the processing of the green color, the yellow reacts. In this manner, in the RGB color system, a color is expressed as an additive mixture. Therefore, in some cases, a spectrum different from the actual spectrum reacts.

As described above, the high rendering color processing unit 400 according to the first embodiment has the spectral decomposition unit to perform the retinex processing for each spectrum by decomposing a spectrum in the HSV color space in the pseudo manner.

As described above, in the example of the image correction of the related art, the yellow color is treated as the red color in the processing of the red, and they are not distinguished. However, the yellow color reacts in the processing of the green processing. According to this embodiment, for example, when a color is decomposed into eight spectra as described in conjunction with FIG. 13A or 13B, it is possible to distinguish between the red object region and the yellow object region. Therefore, it is possible to apply suitable correction to each spectrum.

According to the first embodiment, it is possible to suitably perform the image correction process with a high color rendering property.

[Other Modifications of First Embodiment]

In the first embodiment, the RGB color space signal is transformed to the HSV color space signal, and the image correction is performed as illustrated in FIG. 9. Alternatively, the HSL (HLS) color space illustrated in FIGS. 5C and 5D may also be employed instead of the HSV color space.

[Image Correction Unit of Image Processing Apparatus of Second Embodiment]

In the first embodiment, an exemplary image processing apparatus having retinex processing in a color region depending on the hue has been described using the high rendering color processing unit 400. According to the second embodiment, by modifying the first embodiment of the invention, the image processing apparatus performs retinex processing in the grayscale region and the color region.

In the image processing apparatus according to this embodiment, the high rendering color processing unit 400 of the image correction unit 320 of FIG. 9 is substituted with a high rendering color processing unit 420 of FIG. 17. FIG. 17 is a block diagram illustrating the high rendering color processing unit 400 according to the second embodiment of the invention.

The high rendering color processing unit 420 includes a spectral decomposition unit 401, a first synthesis unit 405, a second synthesis unit 406, a first RT unit 550, a second RT unit 560, an inversion unit 421, a third RT unit 570, and a spectrum synthesis unit 424.

The spectral decomposition unit 401, the first synthesis unit 405, the second synthesis unit 406, the first RT unit 550, and the second RT unit 560 are similar to those of the high rendering color processing unit 400 of the first embodiment.

According to the second embodiment, the inversion unit 421 and the third RT unit 570 is added to those described above.

The inversion unit 421 receives the chroma gain signal 404 as an input and outputs a grayscale gain signal 422 in which the level of the chroma is inverted. The third RT unit 570 receives, as an input, the grayscale gain signal 422 output from the inversion unit 421 and the lightness signal 304, performs the retinex processing, and outputs a third lightness correction signal 423.

The spectrum synthesis unit 424 receives, as an input, the first lightness correction signal 409 output from the first RT unit, the second lightness correction signal 410 output from the second RT unit, and the third lightness correction signal 423 output from the third RT unit 570, and outputs a lightness correction signal 307 obtained by adding the three lightness signals.

[Relationship Between Spectral Decomposition and Chroma Gain in High Rendering Color Processing Unit of Second Embodiment]

Next, a relationship between the spectral decomposition and the chroma gain in the high rendering color processing unit will be described with reference to FIGS. 15B and 15C.

FIGS. 15B and 15C illustrate examples of the chroma gain signal and the grayscale gain signal. Assuming that the chroma gain signal obtained by inverting the level of the chroma signal, that is, the chroma signal (having a range of 0 to 100) is denoted by "S", the grayscale gain signal having a range "S'=100−S" has a higher gain in the grayscale region having a low chroma, and the gain decreases as the chroma increases. Here, the chroma gain signal and the grayscale gain signal are set such that their sum becomes "1.0".

Since there is no hue information in the input of the third RT unit 570, it is possible to equally correct all colors perceived in the grayscale.

[Effects of Second Embodiment]

Using the high rendering color processing unit 420 according to the second embodiment described above, the correction is performed equally between the grayscale region and the color region. Therefore, it is possible to process the image correction at a high contrast with a high color rendering property while color noise being suppressed.

[Image Correction Unit of Image Processing Apparatus of Third Embodiment]

In the second embodiment described above, the image processing apparatus that processes the image correction with a high color rendering property at a high contrast using the high rendering color processing unit 420 has been described by way of example. According to the third embodiment, the image processing apparatus can perform image correction without changing the hue unlike the first and second embodiments.

Figure 18:
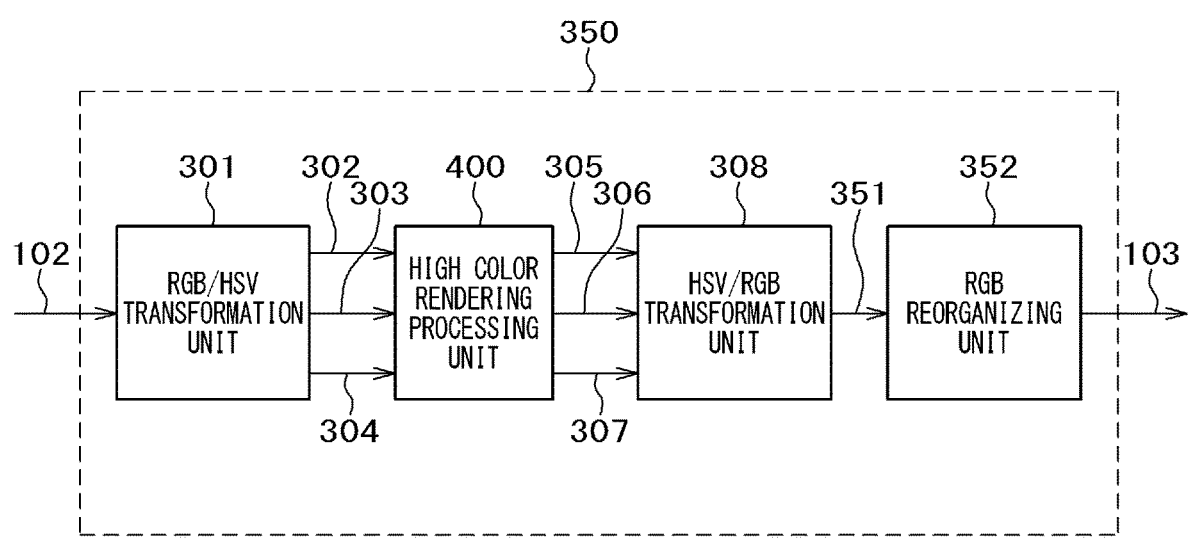
FIG. 18 is a block diagram illustrating an image correction unit 350 of an image processing apparatus according to a third embodiment of the invention.

In the image processing apparatus according to the third embodiment, the image correction unit 320 of FIG. 1 is substituted with an image correction unit 350 of FIG. 18. FIG. 18 is a block diagram illustrating the image correction unit 350 of the image processing apparatus according to the third embodiment of the invention.

The image correction unit 350 according to the third embodiment includes an RGB-HSV transformation unit 301, a high rendering color processing unit 400, an HSV-RGB transformation unit 308, and an RGB reorganizing unit 352.

In the image correction unit 350 of FIG. 18, the RGB reorganizing unit 352 is added to the image correction unit 320 of the first embodiment. The RGB-HSV transformation unit 301, the high rendering color processing unit 400, and the HSV-RGB transformation unit 308 are similar to those of the image correction unit 320 of the first embodiment.

The RGB reorganizing unit 352 sets color information as a distance in the RGB space and reorganizes the correction image from the distance ratio between the corrected image signal and the image signal prior to the correction. Assuming that a color vector of the image signal 102 of the origin is denoted by "I=($I_R$, $I_G$, $I_B$)", the RGB correction signal 351 is denoted by "IRT", and the correction image signal 103 is denoted by "I'", the following Formula 16 is established.

[Formula 16]

$$I'_i = \frac{\|I_{RT}(x, y)\|}{\|I\|} I_i, \|I\| = \sqrt{I_R^2 + I_G^2 + I_B^2}, (i = R, G, B) \quad (16)$$

[Effects of Third Embodiment]

Using the image correction unit 350 according to the aforementioned embodiment, it is possible to calculate a suitable correction amount for a grayscale or color region and perform image correction with a suitable color balance.

[Image Correction Unit of Image Processing Apparatus of Fourth Embodiment]

In the third embodiment, the RGB reorganizing unit 352 is provided in the configuration of the first embodiment. According to the fourth embodiment, an image processing apparatus additionally having a color calibration capability with a small circuit will be described.

Figure 19:
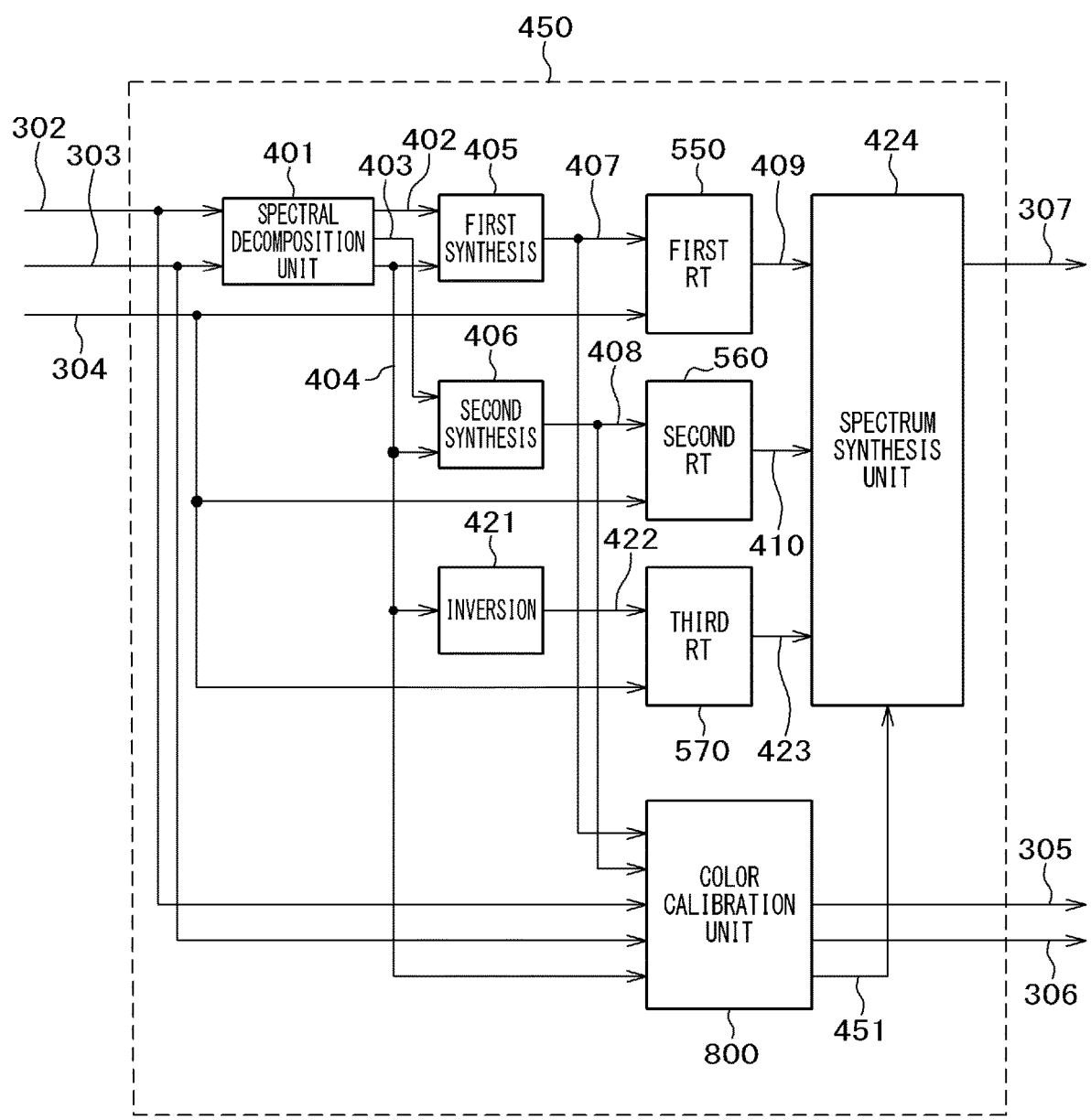
FIG. 19 is a block diagram illustrating a high rendering color processing unit 450 according to the fourth embodiment of the invention.
Figure 20:
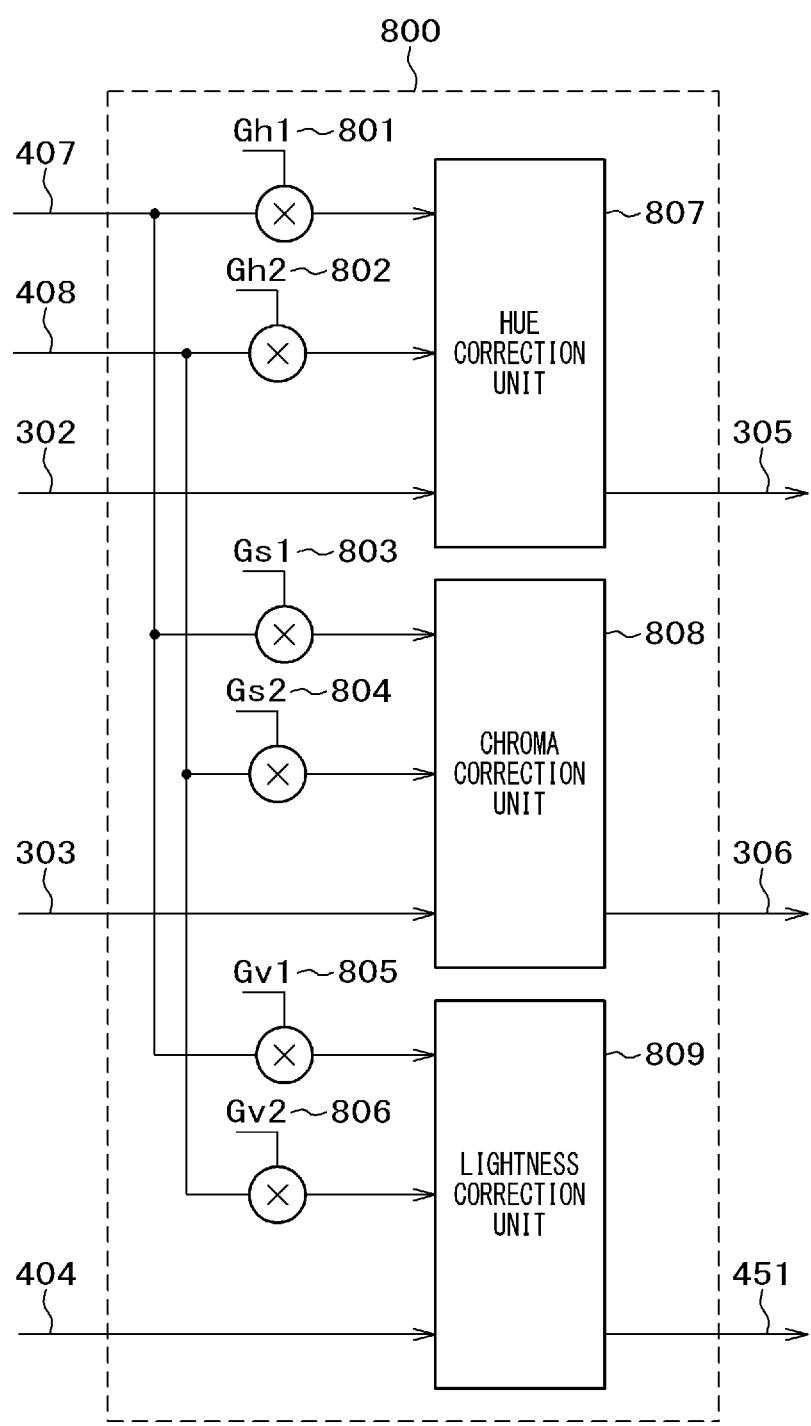
FIG. 20 is a block diagram illustrating a color calibration unit 800.

According to the fourth embodiment, the high rendering color processing unit 400 of the image correction unit 350 is substituted with a high rendering color processing unit 450 of FIG. 19. FIG. 19 is a block diagram illustrating the high rendering color processing unit 450 according to the fourth embodiment of the invention. FIG. 20 is a block diagram illustrating a color calibration unit 800.

The high rendering color processing unit 450 includes a spectral decomposition unit 401, a first synthesis unit 405, a second synthesis unit 406, a first RT unit 550, a second RT unit 560, an inversion unit 421, a third RT unit 570, a spectrum synthesis unit 424, and a color calibration unit 800.

According to the fourth embodiment, the high rendering color processing unit 450 is substituted with the high rendering color processing unit 420 of the second embodiment. The spectral decomposition unit 401, the first synthesis unit 405, the second synthesis unit 406, the first RT unit 550, the second RT unit 560, the inversion unit 421, the third RT unit 570, and the spectrum synthesis unit 424 are similar to those of the second embodiment.

The color calibration unit 800 receives, as an input, the first synthesis gain signal 407, the second synthesis gain signal 408, the hue signal 302, the chroma signal 303, the chroma gain signal 404, and calibration gains (not shown in FIG. 19) such as a hue calibration gain, a chroma calibration gain, and a lightness calibration gain input from a user for calibration, and outputs a hue correction signal 305, a chroma correction signal 306, and a lightness offset signal 451.

As illustrated in FIG. 20, the color calibration unit 800 includes a hue correction unit 807, a chroma correction unit 808, and a lightness correction unit 809.

The hue correction unit 807 receives, as an input, for example, gains obtained by multiplying the first and second synthesis gain signals 407 and 408 by a hue calibration gain Gh1 (801) and a hue calibration gain Gh2 (802), respectively, that can be adjusted by a user for each color for the decomposed spectra, and the hue signal 302, corrects the hue, and outputs the hue correction signal.

The chroma correction unit 808 receives, as an input, gains obtained by multiplying the first and second synthesis gain signals 407 and 408 similar to those of the hue correction unit 807 by a chroma calibration gain Gs1 (803) and a chroma calibration gain Gs2 (804), respectively, that can be adjusted by a user, and the chroma signal 303, corrects the chroma, and outputs the chroma correction signal.

The lightness correction unit 809 receives, as an input, gains obtained by multiplying the first and second synthesis gain signals 407 and 408 similar to those of the hue correction unit 807 by a lightness calibration gain Gv1 (805) and a lightness calibration gain Gv2 (806), respectively, that can be adjusted by a user, and the chroma gain signal 404, corrects the lightness, and outputs the lightness offset signal.

[Color Calibration of Fourth Embodiment]

Figure 21A:
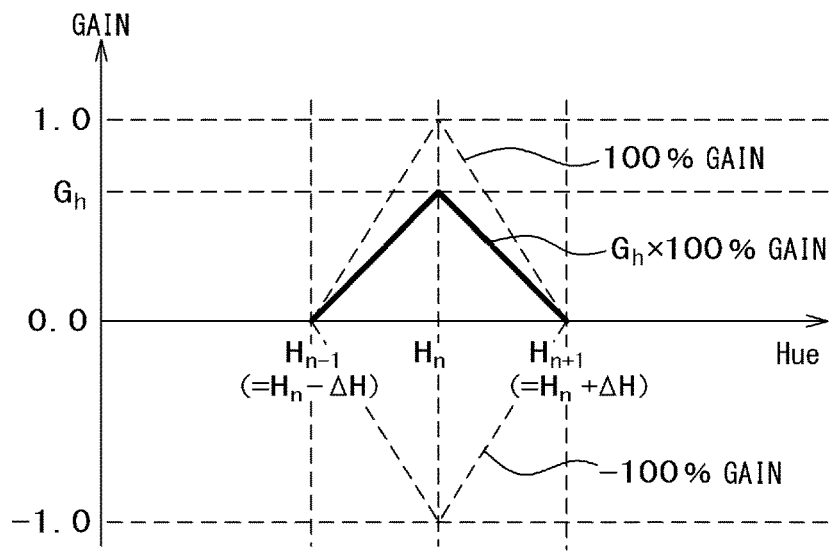
FIG. 21A is a graph illustrating exemplary hue calibration.
Figure 21B:
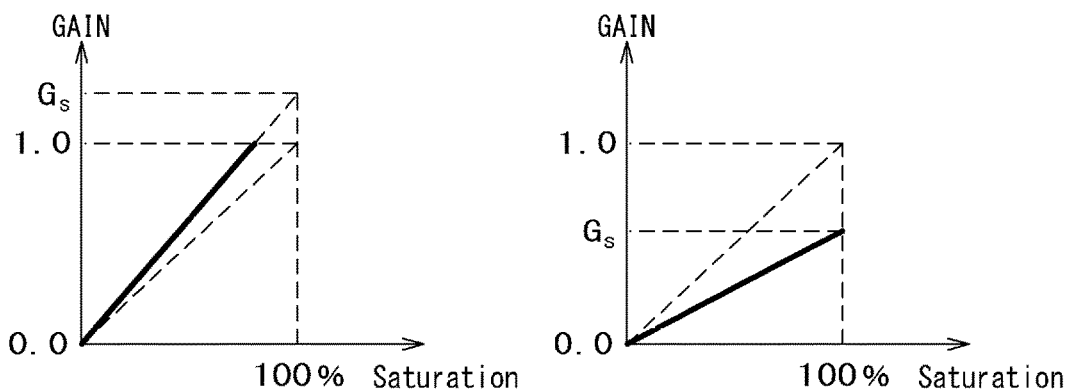
FIG. 21B is a graph illustrating exemplary chroma calibration.
Figure 21C:
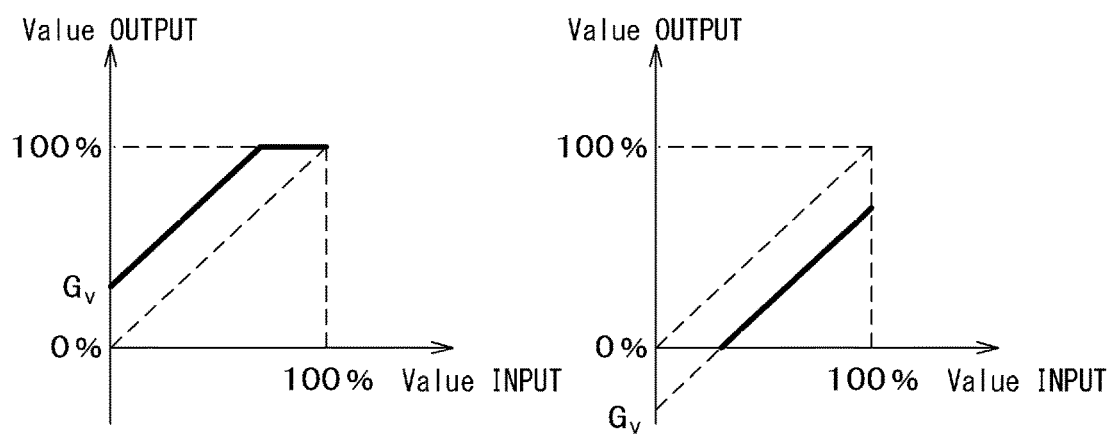
FIG. 21C is a graph illustrating exemplary lightness calibration.

Next, color calibration of the color calibration unit 800 according to the fourth embodiment will be described with reference to FIGS. 21A to 21C. FIG. 21A is a graph illustrating exemplary hue calibration. FIG. 21B is a graph illustrating exemplary chroma calibration. FIG. 21C is a graph illustrating exemplary lightness calibration.

In the graph of FIG. 21A, the abscissa refers to an input hue value, and the ordinate refers to a hue calibration gain Gh1 or Gh2 with respect to a hue gain of 100%. Here, when the hue gain is set to 100%, for example, the case of N-segmented spectra (n=0, 1, 2, ..., N−1) may be adapted to a correction amount of 2π/N. The hue calibration gain is multiplied by this correction amount.

Note that, since the signal input to the hue correction unit 807 is a synthesis gain for the (n)th spectrum and the (n+1)th spectrum, this is a synthesis of the hue gain and the chroma gain.

In the chroma calibration graph of FIG. 21B, the abscissa refers to an input chroma value, and the ordinate refers to a chroma calibration gain Gs1 or Gs2 with respect to a chroma gain of 100%. Here, the chroma calibration gain is multiplied by the input chroma value, so that an output chroma value is obtained.

Note that, in the chroma correction unit 808, the gain signal synthesized with the hue gain is employed. Therefore, the (n)th spectrum and the (n+1)th spectrum are computed.

In the lightness calibration graph of FIG. 21C, the abscissa refers to an input lightness value, and the ordinate refers to an output lightness value. The lightness calibration gain Gv1 or Gv2 is multiplied by the lightness of 100%, and is added to the lightness signal in the spectrum synthesis unit as the lightness offset signal 451.

Note that, in the lightness correction unit 809, the gain signal synthesized with the hue gain is employed. Therefore, the (n)th spectrum and the (n+1)th spectrum are computed. Alternatively, a color having a thin chroma may be protected by further multiplying the chroma gain signal 404.

[Effects of Fourth Embodiment]

In the related art, the color calibration unit is typically implemented as a separated circuit from the color correction unit. According to this embodiment, the high rendering color processing unit 450 has the color calibration unit 800, so that the color transformation capability or the gain capability is shared. Therefore, it is possible to provide an image processing apparatus having a color calibration capability with a small circuit.

REFERENCE SIGNS LIST 10 image apparatus
11 image input signal
12 display control signal
13 projection image
100 image processing apparatus
101 image signal processing unit
102 image signal
103 correction image signal
104 timing control unit
200 image display apparatus 201 light source
202 light source
203 liquid crystal panel
204 light beam passing through the liquid crystal panel
205 lens
300 image correction unit
301 RGB-HSV transformation unit
302 hue signal
303 chroma signal
304 lightness signal
305 hue correction signal
306 chroma correction signal
307 lightness correction signal
308 HSV-RGB transformation unit
320 image correction unit
350 image correction unit
351 RGB correction signal
352 RGB reorganizing unit
400 high rendering color processing unit
401 spectral decomposition unit
402 first hue gain signal
403 second hue gain signal
404 chroma gain signal
405 first synthesis unit
406 second synthesis unit
407 first synthesis gain signal
408 second synthesis gain signal
409 first lightness correction signal
410 second lightness correction signal
411 spectrum synthesis unit
421 inversion unit
422 grayscale gain signal
423 third lightness correction signal
424 spectrum synthesis unit
450 high rendering color processing unit
451 lightness offset signal
500 RT unit
501 first filter unit (scale: small)
502 second filter unit (scale: large)
503 first filter output signal
504 second filter output signal
550 first RT unit
551 lightness correction signal
560 second RT unit
570 third RT unit
600 retinex processing unit (MSR)
601 reflection light component
602 illumination light integrator
620 reflection light component generator (MSR)
621 gain (MSR)
650 retinex processing unit (first embodiment)
651 reflection light component
670 reflection light component generator
671 distribution of SPECULAR
672 distribution of DIFFUSE
673 distribution of AMBIENT
674 first detection unit (specular detection)
675 second detection unit (diffuse detection)
676 specular component
677 diffuse component
678 gain (Phong model)
701 specular reflection light (SPECULAR)
702 diffuse reflection light (DIFFUSE)
703 ambient reflection light (AMBIENT)
704 circular highlight illuminating sphere
800 color calibration unit
801 hue calibration gain 1 (Gh1)
802 hue calibration gain 2 (Gh2)
803 chroma calibration gain 1 (Gs1)
804 chroma calibration gain 2 (Gs2)
805 lightness calibration gain 1 (Gv1)
806 lightness calibration gain 1 (Gv2)

The invention claimed is:

1. An image processing apparatus that receives an image signal and outputs a signal subjected to image correction performed by an image correction unit on the basis of retinex processing, the image correction unit having:
    a transformation unit that performs transformation from a RGB color space to a HSV color space or HSL color space on an input image signal and outputs a transformed image signal; and
    a spectral decomposition unit that performs spectral decomposition for the transformed image signal, the spectral decomposition of the transformed image signal is hue-based spectral decomposition in the HSV color space or HSL color space;
    a first retinex unit that performs retinex processing for a lightness signal on the basis of a hue signal and a chroma signal from the spectral decomposition unit and outputs a first lightness correction signal;
    an inversion unit that receives the chroma signal from the spectral decomposition unit and outputs a gain signal in which a level of the chroma signal is inverted;
    a second retinex unit that performs retinex processing for the lightness signal on the basis of the gain signal output from the inversion unit and outputs a second lightness correction signal;
    a spectrum synthesis unit that synthesizes the first and second lightness correction signals output from the first and second retinex units; and
    an inverse transformation unit that performs transformation from the HSV color space or HSL color space to the RGB color space on an output signal from the spectrum synthesis unit and outputs an image correction signal, wherein each of the first and second retinex units include:
        a first detection unit that detects a specular reflection component on the basis of the lightness signal,
        a second detection unit that detects a diffuse reflection component on the basis of the lightness signal, and
        a reflection light generator that generates a reflection light component on the basis of the specular reflection component and the diffuse reflection component,
    wherein the first retinex unit outputs the first lightness correction signal based on the reflection light component, the hue signal and the chroma signal, and
    wherein the second retinex unit outputs the second lightness correction signal based on the reflection light component and the gain signal.

2. The image processing apparatus according to claim 1, wherein the image correction unit further has an RGB reorganizing unit that multiplies the image correction signal output from the inverse transformation unit by norms of R, G, and B of the input image signal in the RGB color space and outputs a result of the multiplication.

3. The image processing apparatus according to claim 1, wherein the spectral decomposition is performed such that the transformed image signal is decomposed into three or more spectra that are not overlapped with each other, and a sum of gains of respective signals obtained for each spectrum becomes constant across all of spectral regions.

4. The image processing apparatus according to claim 1, wherein the retinex processing of the first and second retinex units is performed on the basis of computation results of a first output obtained by applying a specular reflection component filter to the lightness signal, a second output obtained by applying a diffuse reflection component filter to the lightness signal, and a third output obtained by applying an ambient light component filter to the lightness signal.

5. The image processing apparatus according to claim 4, wherein the ambient light component filter is a filter based on a normal distribution.

6. The image processing apparatus according to claim 4, wherein the diffuse reflection component filter is a filter based on a cosine of an angle between a light beam and a normal line of a surface.

7. The image processing apparatus according to claim 4, wherein the specular reflection component filter is a filter based on a power of a cosine of an angle between a line of sight and a normal line of a surface.

8. The image processing apparatus according to claim 1, wherein the image correction unit has a color calibration unit that receives a hue calibration gain for the hue signal, a chroma calibration gain for the chroma signal, and a lightness calibration gain for the lightness signal and outputs a hue correction signal, a chroma correction signal, and a lightness offset signal adjusted by respective gains to the inverse transformation unit.

* * * * *